United States Patent
Yoshioka

(10) Patent No.: US 7,035,969 B2
(45) Date of Patent: Apr. 25, 2006

(54) RECORDING MEDIUM HAVING RECORDING PROGRAM RECORDED THEREIN

(75) Inventor: Shingo Yoshioka, Kanagawa (JP)

(73) Assignees: Sony Corporation, Tokyo (JP); Pioneer Corporation, Tokyo (JP)

( * ) Notice: Subject to any disclaimer, the term of this patent is extended or adjusted under 35 U.S.C. 154(b) by 463 days.

(21) Appl. No.: 10/431,118

(22) Filed: May 6, 2003

(65) Prior Publication Data

US 2003/0212703 A1 Nov. 13, 2003

(30) Foreign Application Priority Data

May 8, 2002 (JP) .............................. P2002-132239

(51) Int. Cl.
*G06F 12/00* (2006.01)

(52) U.S. Cl. .............................. 711/112; 707/1; 707/10; 707/205; 711/111; 711/170; 711/205; 710/3; 705/57

(58) Field of Classification Search .................... 707/1, 707/10, 205; 711/170, 205, 111; 710/3; 705/57; 360/124
See application file for complete search history.

(56) References Cited

U.S. PATENT DOCUMENTS

| | | | | |
|---|---|---|---|---|
| 5,029,125 A | * | 7/1991 | Sciupac | 707/205 |
| 5,901,119 A | * | 5/1999 | Inoue | 369/30.09 |
| 5,940,853 A | * | 8/1999 | Ooi et al. | 711/111 |
| 6,072,759 A | * | 6/2000 | Maeda et al. | 369/59.25 |
| 6,137,769 A | * | 10/2000 | Sawada et al. | 369/275.3 |
| 6,353,580 B1 | * | 3/2002 | Mons | 369/32.01 |
| 6,370,090 B1 | * | 4/2002 | Verbakel et al. | 369/30.04 |
| 6,631,387 B1 | * | 10/2003 | Kim et al. | 707/205 |
| 6,732,192 B1 | * | 5/2004 | Todo et al. | 710/3 |

* cited by examiner

*Primary Examiner*—Pierre Bataille
*Assistant Examiner*—Chase Peers
(74) *Attorney, Agent, or Firm*—Frommer Lawrence & Haug LLP; William S. Frommer

(57) ABSTRACT

The present invention provides an optical disk drive, optical disk recording method, optical disk recording program and a recording medium having the optical disk recording method recorded therein, applicable to a DVD drive, for example, to permit recording of also a file of still pictures other than moving pictures, thereby enabling more effective use of the information recording area of the optical disk and more quick search for desired data. To this end, the address of management information (DK) is identified with reference to a management table (TV) recorded in a fixed area on the optical disk, and a recording format is selected for the management information (DK) to be recorded in combination with an extension file (EF).

30 Claims, 12 Drawing Sheets

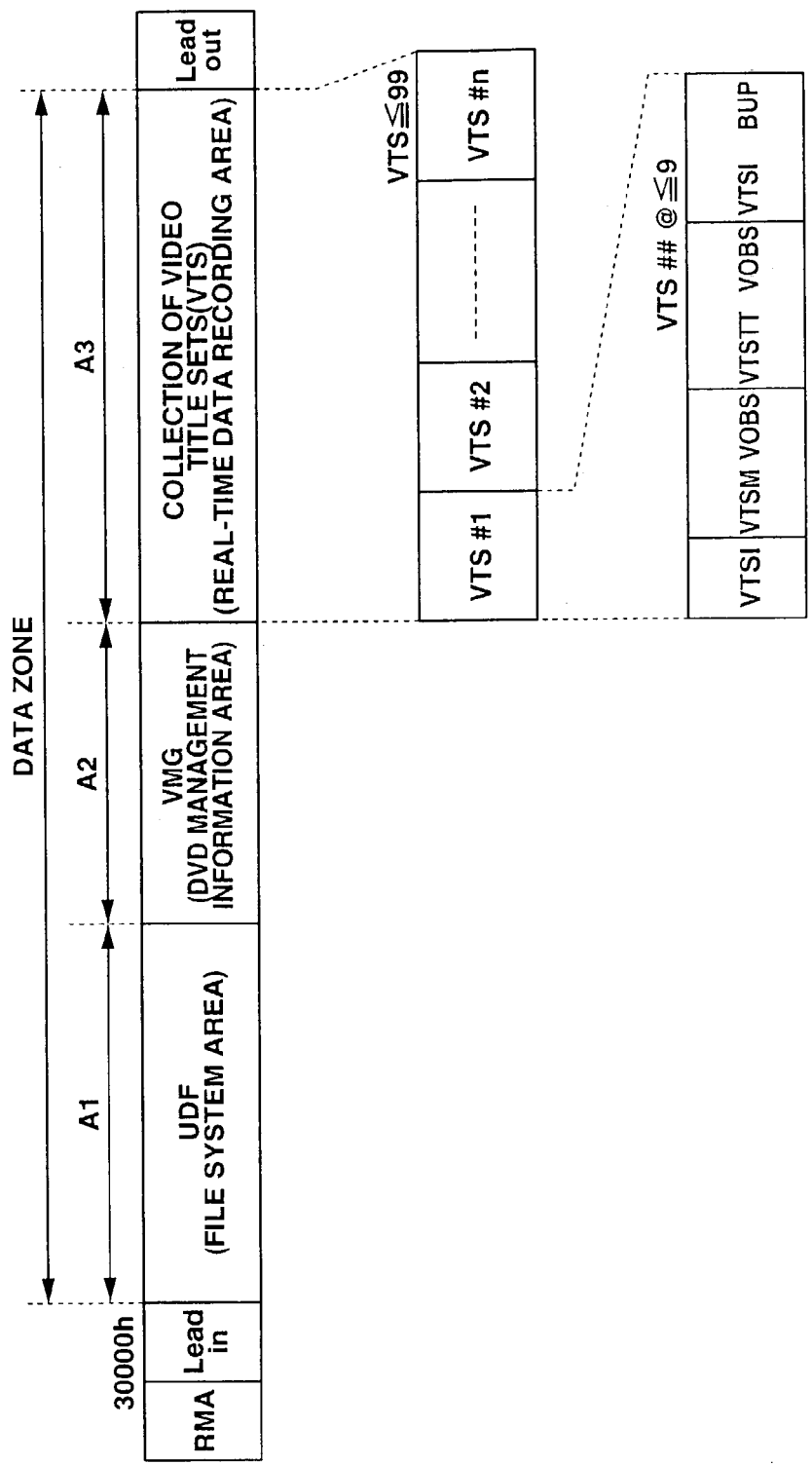

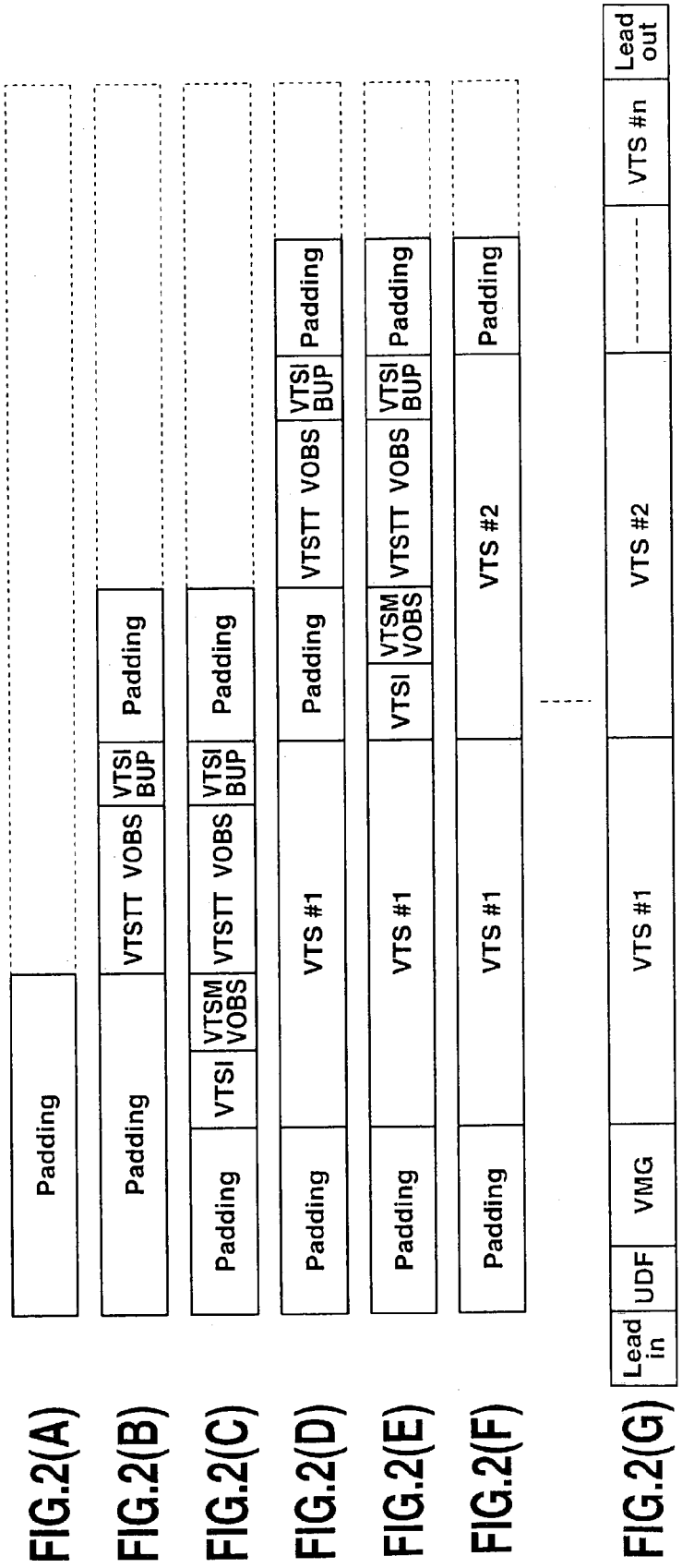

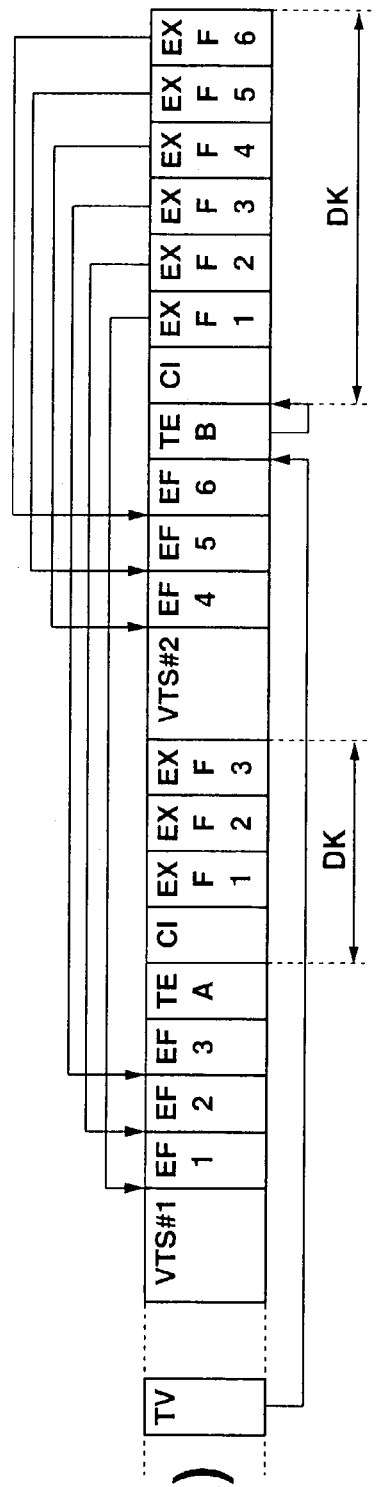
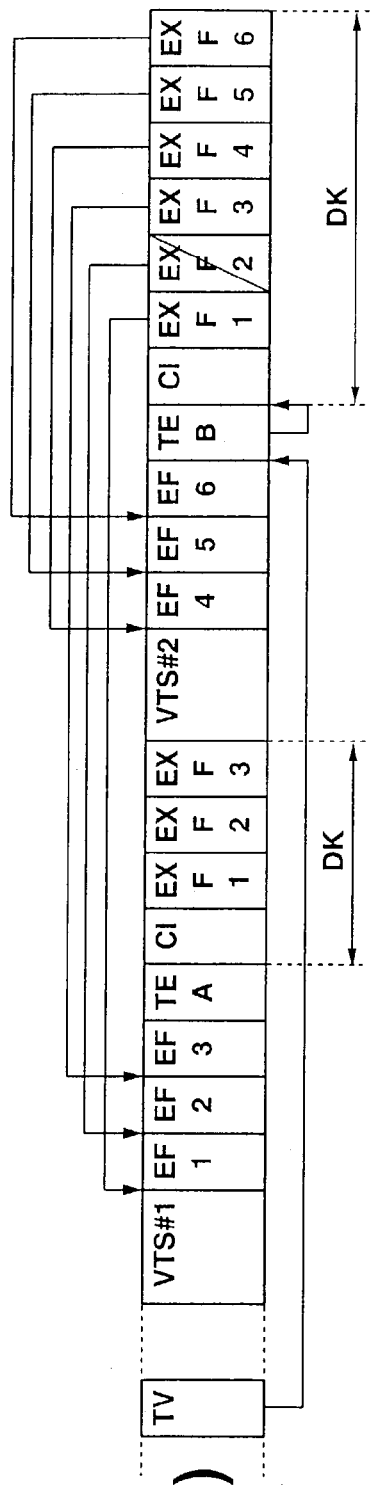
FIG.12(A)
FIG.12(B)

RECORDING MEDIUM HAVING RECORDING PROGRAM RECORDED THEREIN

BACKGROUND OF THE INVENTION

1. Field of the Invention

The present invention relates to a recording medium, a recording method, a recording program, and a recording medium having the recording program recorded therein. The present invention is applicable to a DVD (digital versatile disk), for example. According to the present invention, the address of management information is identified with reference to a management table recorded in a fixed area of the optical disk so that a file of still pictures other than moving pictures can also be recorded by selecting a format for the management information to be recorded in combination with the file on the basis of the attribute of the file. Thus the information recording area on an optical disk can be utilized more effectively and desired data can be searched more quickly.

This application claims the priority of the Japanese Patent Application No. 2002-132239 filed on May 8, 2002, the entirety of which is incorporated by reference herein.

2. Description of the Related Art

Conventionally, there are available DVDs as large-capacity optical disks including writable DVDs (digital versatile disk) such as a DVD-R (DVD-recordable), DVD-RW (DVD-rewritable) and DVD-RAM (DVD-random access memory). Of these DVDs, DVD-R and DVD-RW having video data recorded therein in a format complying with the DVD video format can be reproduced by a reproduce-only DVD player or a computer to reproduce the video data.

FIG. 1 shows a chart explaining the DVD video format-based logical format of an optical disk. As shown in FIG. 1(A), the optical disk logically formatted according to the DVD video format has an information recording area thereof divided into a zone called "lead-in" at the innermost circumference thereof, a data zone and a zone called "lead-out" at the outermost circumference. The optical disk will have desired video data or the like recorded to the data zone thereof.

As shown, the data zone consists of a UDF (universal disk format) area (file system area) A1, VMG (video manager) area (DVD management information area) A2 and a real-time data recording area A3 in this order from the lead-in zone. The UDF and VMG areas are provided to record management information used to manage files of video data recorded in this optical disk. Of these UDF and VMG areas, the VMG area A2 is directed to a DVD player and will have recorded thereto TOC information (table of contents) used for management of all video data recorded in the real-time data recording area A3. On the other hand, the UDF area A1 is directed to a file management by a computer, and will have recorded thereto management information used for management of all the video data recorded in the real-time data recording area A3 in a format compatible with the file management system of the computer.

As shown in FIG. 1(B), the real-time data recording area A3 is a program area where real data are to be recorded, and will have video data recorded therein in units of VTS (video title set; will be referred to simply as "title" wherever appropriate hereunder). It should be noted that a maximum of 99 VTSs can be provided. It is also important to note that as shown in FIG. 1(C), the "VTS" is composed of VTSI (video title set information), VTSM VOBS (video object set for the VTSM), VTSTT VOBS (video object set for titles in a VTS), and VTSI BUP (backup of VTSI) in this order. VTSTT VOBS will have recorded thereto MPEG (Moving Pictures Experts Group)-2-formatted video data as real video data, VTSI will have recorded thereto the address information etc. for management of the video data composed of real data, and VTSM VOBS will have a title menu of the video data recorded thereto. It should be noted that VTSM VOBS is an option and VTSI BUP is a backup of VTSI.

When the above optical disk is accessed by a computer, a desired file can be searched based on UDF for reproduction. When the optical disk is accessed by a DVD player, a desired file can be searched based on VMG for reproduction. Namely, UDF is supported by the file management system of the computer to manage video data recorded in the optical disk, while VMG is supported by the DVD player to manage video data recorded in the optical disk.

Video data is written to such an optical disk by either an incremental recording method (will be referred to as "INC method" hereunder) or restricted overwrite method (will be referred to as "ROW method" hereunder). The INC method is intended for sequential recording of video data, while the ROW method is applied to an overwritable optical disk. In the ROW method as well, however, video data which are to be recorded to a fresh (unrecorded) area will sequentially be recorded. In these INC and ROW methods, an RMA (recording management area) formed along the inner circumference of the lead-in zone provides an area management such as padding (will be described in detail later) or the like.

FIG. 2 shows a chart for explaining the ROW-based recording procedure. In the ROW method, a lead-in, UDF and VMG areas, and areas for recording the leading titles VTSI and VTSM VOBS are reserved by padding as shown in FIG. 2(A). It should be noted that the "padding" refers to a process for reserving an area by recording there dummy data such as null (zero) or the like.

In the ROW method, when these areas are reserved, video data are sequentially recorded to define a VTSTT VOBS of real data as shown in FIG. 2(B). Upon completion of recording the real data under one title, a VTSI BUP area is defined, and padding is done for securing recording areas for subsequent titles VTSI and VTSM VOBS, as shown in FIG. 2(B). Then, defining VTSI and VTSM VOBS areas for recording the real data will be repeated again from the beginning as shown in FIG. 2(C). Thus, one VTS is recorded in the optical disk by the ROW method.

In the ROW method, for continuously recording a next title, real data are recorded following a padded area composed of a preceding VTS to define VTSTT VOBS and VTSI BUP areas, and then padding is done for securing subsequent titles VTSI and VTSM VOBS, as will be known from FIG. 2(D). Subsequently, areas are defined for titles VTSI and VTSM VOBS as shown in FIG. 2(E) to thereby record successive VTSs to the optical disk as shown in FIG. 2(F). In the ROW method, for successively recording titles, similar padding is done to record VTSs sequentially.

On the other hand, in an optical disk having such VTSs sequentially recorded therein to define a real-time data recording area, the ROW method defines UDF and VMG areas by finalization, and then lead-in and lead-out as shown in FIG. 2(G) to thereby establish compatibility with a read-only optical disk. It should be noted that the UDF and VMG areas are defined by producing UDF and VMG data from the VTSI and VTSM VOBS title data and recording the-data to an inner-circumferential leading area by padding.

In the Japanese laid-open patent Publication Nos. 2002-063765, 2001-148166 and 2002-56609, it is proposed to record the top address of VTSI corresponding to a management table formed along the inner circumference of an optical disk correspondingly to recording of a title, manage the program area according to the management table to record a file of moving pictures and thus make each title accessible with reference to the management table even in a step before the finalization.

It is conceivable that such an optical disk is played in place of the magnetic tape in a portable video recorder. In this case, since the conventional video tape recorder can record moving pictures as well as still pictures, such an optical disk for use with the portable video disk recorder should also desirably be capable of recording still pictures other than moving pictures.

Note that in the aforementioned format, no consideration is given to such a file recording and hence it will be necessary to hold still pictures or the like in a memory and record them to another recording medium.

For such a file recording, it is desired that the information recording area can be utilized more effectively and a desired one of recorded files can be searched more quickly.

OBJECT AND SUMMARY OF THE INVENTION

It is therefore an object of the present invention to overcome the above-mentioned drawbacks of the related art by providing a recording apparatus, a recording method, a recording program, and a recording medium having the recording program recorded therein, capable of recording also a file of still pictures other than moving pictures in such a manner that the information recording area of a recording medium can be utilized more effectively and a desired one of recorded files can be searched more quickly.

The above object can be attained by providing a recording apparatus as set forth in claim 1 which will be appended later, in which a moving picture file formatted for reproduction by a dedicated reproducing apparatus for the recording medium is recorded in combination with management information for the file to a program area, while the address of the management information is recorded to a management table; an extension file other than the moving picture file formatted for reproduction by the reproducing apparatus is recorded in combination with management information for the extension file to the program area with selection of a recording format for the extension file and different from that of the moving picture file; guide information for the extension file, including at least the address of the extension-file management information, is recorded to the recording medium; and the address of the extension-file guide information is recorded to the management table.

In the above recording apparatus according to the present invention, a moving picture file formatted for reproduction by a dedicated reproducing apparatus for the recording medium, such as a DVD video-formatted moving picture file, is recorded in combination with management information for the file to a program area, while the address of the management information is recorded to a management table; an extension file other than the moving picture file formatted for reproduction by the reproducing apparatus, such as a still picture file, is recorded in combination with management information for the extension file to the program area with selection of a recording format for the extension file and different from that of the moving picture file; guide information for the extension file, including at least the address of the extension-file management information, is recorded to the recording medium; and the address of the extension-file guide information is recorded to the management table, whereby the management table for the moving picture file can effectively be utilized to access the management information recorded along with the extension file. Thus, the information recording area can effectively be utilized to record the extension file quickly accessibly. Also, by selecting a recording format for a file and management information for the file for each of a moving picture file and an extension file, the moving picture file, for example, can be recorded in a DVD video format, while a still picture file other than the moving picture file can be recorded reproducibly with no influence on the reproduction in the DVD video format. Thus, a still picture file other than a moving picture file can be recorded.

Also the above object can be attained by providing a recording method as set forth in claim 11 which will be appended later, in which a moving picture file formatted for reproduction by a dedicated reproducing apparatus for the recording medium is recorded in combination with management information for the file to a program area, while the address of the management information is recorded to a management table; an extension file other than the moving picture file formatted for reproduction by the reproducing apparatus is recorded in combination with management information for the extension file to the program area with selection of a recording format for the extension file and different from that of the moving picture file; guide information for the extension file, including at least the address of the extension-file management information, is recorded to the recording medium; and the address of the extension-file guide information is recorded to the management table.

Also the above object can be attained by providing a recording program as set in claim 20 which will be appended later, in which a moving picture file formatted for reproduction by a dedicated reproducing apparatus for the recording medium is recorded in combination with management information for the file to a program area, while the address of the management information is recorded to a management table; an extension file other than the moving picture file formatted for reproduction by the reproducing apparatus is recorded in combination with management information for the extension file to the program area with selection of a recording format for the extension file and different from that of the moving picture file; guide information for the extension file, including at least the address of the extension-file management information, is recorded to the recording medium; and the address of the extension-file guide information is recorded to the management table.

Also the above object can be attained by providing a recording medium having recorded therein a recording program, as set forth in claim 28 which will be appended later, in which a moving picture file formatted for reproduction by a dedicated reproducing apparatus for the recording medium is recorded in combination with management information for the file to a program area, while the address of the management information is recorded to a management table; an extension file other than the moving picture file formatted for reproduction by the reproducing apparatus is recorded in combination with management information for the extension file to the program area with selection of a recording format for the extension file and different from that of the moving picture file; guide information for the extension file, including at least the address of the extension-file management information, is recorded to the data recording medium; and the address of the extension-file guide information is recorded to the management table.

In the above-mentioned recording method, recording program and recording medium, a still picture file other than a moving picture file can be recorded to effectively utilize the information recording area for quick search for the file.

These objects and other objects, features and advantages of the present invention will become more apparent from the following detailed description of the preferred embodiments of the present invention when taken in conjunction with the accompanying drawings.

BRIEF DESCRIPTION OF THE DRAWINGS

FIGS. 1(A) to (C) explain the DVD video format;

FIGS. 2(A) to (G) explain the ROW-based recording;

FIGS. 12(A) and (B) explain processing of the management information for additional recording of the extension file.

DETAILED DESCRIPTION OF THE PREFERRED EMBODIMENTS

The embodiments of the present invention will be described in detail below with reference to the accompanying drawings:

(1) First Embodiment (1-1) Construction of the First Embodiment

Figure 4:
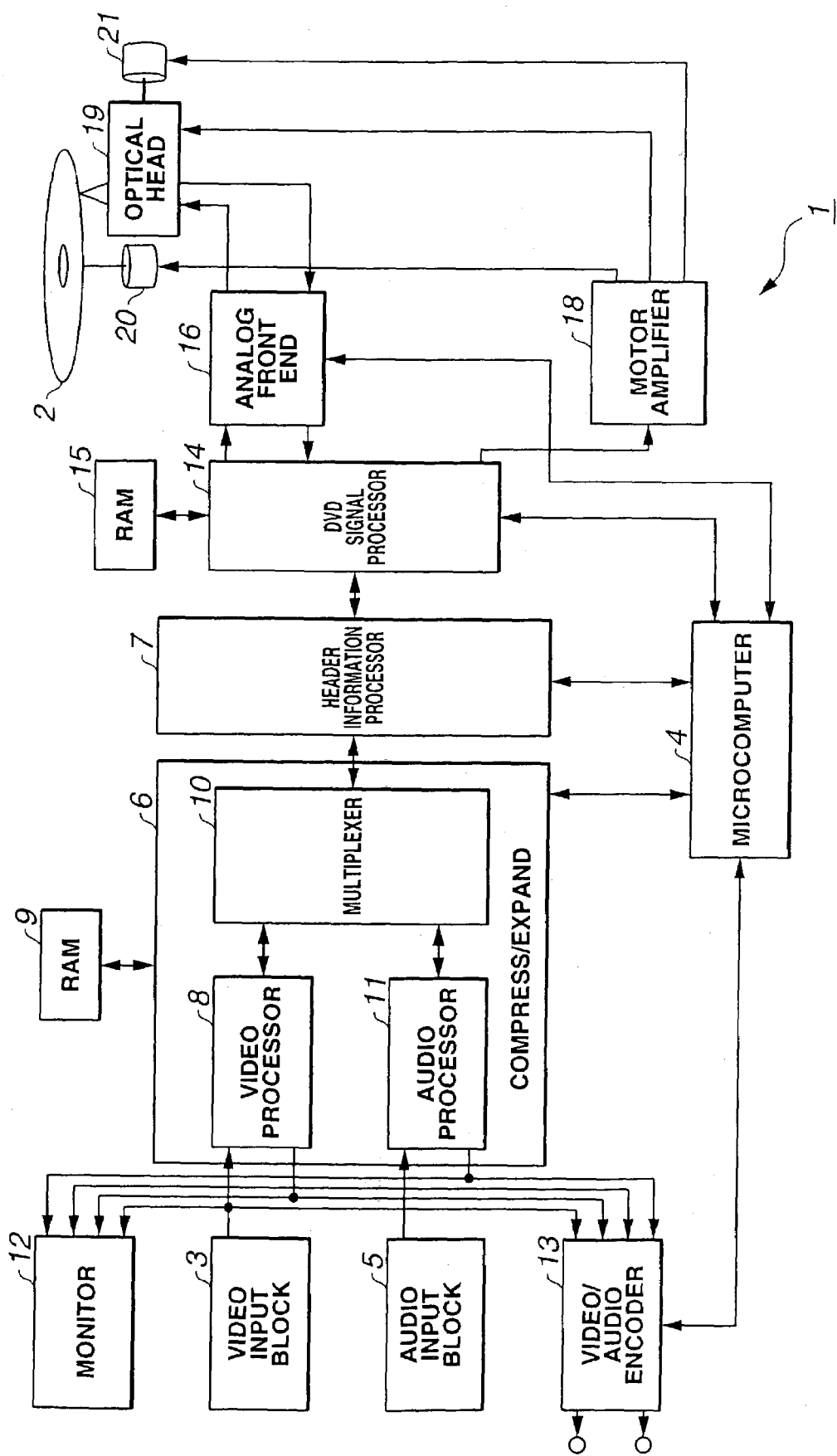
FIG. 4 is a block diagram of the optical disk drive shown in FIG. 3.

FIG. 4 is a block diagram of the first embodiment of the optical disk drive according to the present invention. The optical disk drive is generally indicated with a reference 1. This optical disk drive 1 is a portable video recorder designed to record picked up pictures to an optical disk 2 which is a DVD.

More particularly, the optical disk drive 1 includes a video input block 3 which makes analog-digital conversion of video signals captured by picture pickup means (not shown) or video signals supplied from an external apparatus to provide video data. It should be noted that a plurality of pickup means incorporated in the optical disk drive 1 is controlled by a microcomputer 4 also included in the optical disk drive 1 to provide results of imaging composed of moving pictures or still pictures. Thus, the video input block 3 operates in response to the control by the microcomputer 4 of the pickup means to selectively receive either video data composed of moving picture or still picture data.

The optical disk drive 1 further includes an audio input block 5 which makes analog-digital conversion of audio signals picked up by a microphone or audio signals supplied from outside to produce audio data.

The optical disk drive 1 also includes a compress/expand block 6 whose mode of operation is changed under the control of the microcomputer 4 to process data for recording or reproducing. More specifically, for recording video and audio data supplied from the video input block 3 and audio input block 5, respectively, the compress/expand block 6 will use a random access memory (RAM) 9 to multiplex the video and audio data by compression and supply the data to a head information processor 7. On the contrary, for reproduction of the video and audio data from the optical disk 2, the compress/expand block 6 will also use the RAM 9 to break the data supplied from the header information processor 7 into video and audio data, then expand the video and audio data, respectively, and output the expanded data.

More particularly, for data recording, a video processor 8 included in the compress/expand block 6 is controlled by the microcomputer 4 to compress video data supplied from the video input block 3, and outputs the compressed data. At this time, in case the video data is moving picture data, the compress/expand block 6 will take the MPEG-2 format for compression of the video data, and in case the video data is composed of still pictures, the compress/expand block 6 will compress the data in the JPEG (Joint Photographic Coding Experts Group) format, and output the compressed data. Also, for data reproduction, the video processor 8 will expand video data output from a multiplexer 10 correspondingly to the format, MPEG-2 or JPEG, in which the data has been compressed, and output the expanded data.

For data recording, an audio processor 11 included in the compress/expand block 6 will compress audio data output from the audio input block 5 in an MPEG format, Dolby audio format or a linear PCM format, and output the compressed data. On the contrary, for data reproduction, the audio processor 11 will expand audio data supplied from the multiplexer 10 and output the expanded data.

For data recording, the multiplexer 10 makes time-division multiplexing of video data output from the video processor 8 and audio data output from the audio processor 11, and outputs the multiplexed data to the header information processor 7. On the contrary, for data reproduction, the multiplexer 10 will break the time-division multiplexed data output from the head information processor 7 into video and audio data, and supply these data to the video processor 8 and audio processor 11, respectively.

The optical disk driver 1 also includes a monitor block 12 composed of a display mechanism to monitor video data supplied from the video input block 3, audio data supplied from the audio input block 5 or video data and audio data supplied from the compress/expand block 6, and an audio processing mechanism. Thus, the optical disk drive 1 according to the present invention can monitor captured pictures and sounds and results of data reproduction.

The optical disk drive 1 also includes a video/audio encoder 13 which compresses video and audio data supplied from the video and audio input blocks 3 and 5, respectively, or video and audio data supplied from the compress/expand block 6 in predetermined formats, respectively, and outputs the data to the external apparatus. Thus, the optical disk drive 1 according to the present invention enables to monitor captured pictures and sounds and results of data reproduction on the external apparatus.

For data recording, the header information processor 7 is supplied with time division multiplexed data supplied from the compress/expand block 6 and adds, to the time-division multiplexed data, header information unique to a DVD, header information or the like on an extension file which will be described in detail later, under the control of the microcomputer 4, and outputs the data. Also, according to information supplied from the microcomputer 4, the header information processor 7 will produce data such as UDF, VMG, VTSI, etc. and output these data to a DVD signal processor 14. Also, for data reproduction, the header information processor 7 will separate, from output data from the DVD signal processor 14, head information having been added at the time of recording and output it to the compress/expand block 6, and inform the microcomputer 4 of the separated header information. It should be noted here that the "extension file" is a file not defined in the DVD video format standardized for the optical disk 2 and in this embodiment, a still picture format is applied as the extension file.

For data recording, the DVD signal processor 14 will use a random access memory 15 to generate an error correction code from data output from the header information processor 7 and add the error correction code to the output data. Also, the DVD signal processor 14 makes scrambling, 8/16 modulation and the like and outputs a data string composed of the processing results as a serial data string to an analog front end block 16.

On the contrary, for data reproduction, the DVD signal processor 14 will make error correction, descrambling and decoding of the output data from the analog front end block 16, namely, process the output data in an reverse order to the order in the data recording procedure, and output the results of such processes to the header information processor 7. Also, the DVD signal processor 14 make digital-analog conversion of drive information such as spindle control, tracking control, focus control and sled control data supplied from the microcomputer 4 to provide such drive signals and output the drive signals to a motor amplifier 18.

The analog front end block 16 generates a light amount control signal for a laser beam to be emitted from an optical head 19 to the optical disk 2, and outputs the control signal. For data reproduction, the analog front end block 16 will keep, according to the light amount control signal, the amount of laser beam projected onto the optical disk 2 from the optical head 19 at a constant value for data reading. On the contrary, for data recording, the analog front end block 16 will change the level of the light amount control signal correspondingly to the output data from the DVD signal processor 14, to thereby elevate the amount of laser beam intermittently from the value for data reproduction to a value for data recording correspondingly to the output data from the DVD signal processor 14.

Also, the analog front end block 16 amplifies and processes a result of detection of a return light supplied from the optical head 19 to generate a reproduced signal whose level varies correspondingly to a train of pits formed on the optical disk 2, and processes the reproduced signal for binary differentiation to yield reproduced data which will be supplied to the DVD signal processor 14. With the above processing of the result of return light detection, the analog front end block 16 will generate a tracking error signal and focus error signal of which the levels vary correspondingly to magnitudes of tracking error and focus error, respectively, and output these signals in the form of digital signal to the microcomputer 4.

The motor amplifier 18 is supplied with the drive signals from the DVD signal processor 14, and drives mechanisms corresponding to the drive signals. More specifically, the motor amplifier 18 drives to rotate a spindle motor 20 and sled moor 21 with ones, for spindle control and sled control, of these drive signals. Also, the motor amplifier 18 will drive an actuator installed in the optical head 19 with the drive signals for tracking control-and focus control, respectively.

The spindle motor 20 chucks the optical disk 2 and drives to rotate the latter at a predetermined velocity. The sled motor 21 makes the optical head 19 movable radially of the optical disk 2.

Supplied with the light amount control signal from the analog front end block 16, the optical head 19 will emit a laser beam from a semiconductor laser incorporated therein, and focus the laser beam on the information recording area of the optical disk 2 through an objective lens. Also, a return light, namely, a reflected part of the laser beam projected on the optical disk 2 is guided to a predetermined photodetector element of the optical head 19 through the objective lens, and the result of light detection is supplied to the analog front end block 16. The objective lens of the optical head 19 is movable by the actuator driven with the tracking and focus control drive signals to have the tracking and focus thereof controlled. Also, the amount of laser beam is intermittently elevated according to the light amount control signal, whereby the information recording area of the optical disk 2 is locally elevated in temperature to record desired data there.

The microcomputer 4 is provided as a system controller for the optical disk drive 1. By executing a processing program pre-installed in the optical disk drive 1, supplied with signals of operations made by the user at a control panel (not shown) or supplied with various signals detected by the analog front end block 16, the microcomputer 4 controls the operation of each of the component blocks. More specifically, the microcomputer 4 will be supplied with a tracking error signal and focus error signal detected by the analog front end block 16 to generate tracking and focus control drive information, convert these signals by the DVD signal processor 14 into analog signals and supply the analog signals to the motor amplifier 18 which in turn will control the tracking and focus of the optical head 19. Also, supplied with the header information detected by the header information processor 7, the microcomputer 4 will detect a laser beam-projected position, generates sled control drive information from the result of detection and supply the information to the DVD information processor 14, to thereby perform a seek and the like. Similarly, the microcomputer 4 will make a performance for spindle control.

The basic operations of the microcomputer 4, directed to the optical disk 2, have been described in the foregoing. Here will be described with reference to the flow chart in FIG. 5 operations that will be made by the microcomputer 4 for data read or write after the optical disk drive 1 is turned on. In step SP1, the optical disk drive 1 is turned on. Then the microcomputer 4 goes from step SP1 to SP2 where it will judge based on the result of detection of the optical disk 2 from a detection mechanism (not shown) whether the optical disk 2 is set in place in the optical disk drive 1. If the result of judgment in step SP2 is negative (no optical disk 2 is set in place), the microcomputer 4 will repeat the operation in step SP2. On the contrary, when the optical disk drive 1 has been turned on with the optical disk 2 loaded therein or when the optical disk 2 has been loaded after the optical disk drive 1 is turned on, namely, when the above result of judgment is affirmative (the optical disk 2 is set in place), the microcomputer 4 will go from step SP2 to SP3. It should be noted that if the optical disk drive 1 is turned off when the microcomputer 4 is repeating the operation in step SP2, the microcomputer 4 will go directly to step SP4 where it will exit this reproducing or recording procedure (power off).

In step SP3, the microcomputer 4 drives the sled motor 21 to move the optical head 19 to the innermost circumference of the optical disk 2, and is supplied with the result of reading the innermost-circumferential area from the DVD signal processor 14. In case the optical disk 2 is a finalized one, the microcomputer 4 will acquire data in the VMG area from the DVD signal processor 14. On the contrary, if the optical disk 2 is not any finalized one, the microcomputer 4 will acquire information in the RMA area from the DVD information processor 14. When the microcomputer 4 determines based on the information in the RMA area that data has already been recorded in the real-time data recording area of the optical disk 2, it searches the optical disk 2 for VTSI and VTSTT VOBS data in each VTS. Thus, as in an optical disk drive to record and reproduce an ordinary DVD, the microcomputer 4 will acquire management information required for data write to, and read from, the optical disk 2.

In this procedure, the microcomputer 4 acquires the data in the VMG area and the data in the UDF area as well. When reading the real-time data recording area, the microcomputer 4 will also acquire intermediate management information, if any, found recorded in the real-time data recording area. Thus, the microcomputer 4 acquire also management information for an extension file not defined in the DVD video format to enable reading of the extension file from the optical disk 2. The microcomputer 2 will record and hold a series of thus acquired management information in a built-in memory.

Next, the microcomputer 4 goes to step SP5 where it will judge whether it is instructed to eject the optical disk 2. When the result of judgment is affirmative, the microcomputer 4 will instruct a loading mechanism (not shown) to eject the optical disk 2 and then go back to step SP2.

On the contrary, when supplied with an instruction for other than the ejection of the optical disk 2 from the user, the microcomputer 4 goes from step SP5 to SP6 where it will judge which the supplied user's instruction is, recording (REC), reproduction (PB) or power off. When the user's instruction is "PB (reproduction)", the microcomputer 4 goes from step SP6 to SP7 where it will proceed to reproduction of a file from the optical disk 2 and then return to step SP5.

When the user's instruction is "REC (recording)", the microcomputer 4 goes from step SP6 to SP8 where it will proceed to recording of moving or still pictures to the optical disk 2 and then go back to step SP5. It is important to note that when the optical disk 2 has UDF and VMG areas defined therein through the so-called finalization, the microcomputer 4 will skip over the recording procedure to step SP5 since the optical disk 2 has been processed against data recording. Also, even in case the optical disk 2 is a DVD-RW which is finalized but erasable, the microcomputer 4 will erase the data existent in the optical disk 2 with acknowledgment from the user and proceed to data recording.

When the user's instruction is "Power off", the microcomputer 4 goes from step SP6 to SP9 where it will proceed to turn off the power to the optical disk drive 1 and then return to step SP4 where it will exit this recording or reproducing procedure.

In the recording one of the above procedures, when the optical disk 2 is DVD-R, the microcomputer 4 will adopt the INC method to record a moving or still picture file to the optical disk 2. On the other hand, when the optical disk is DVD-RW or DVD-RAM, the microcomputer 4 will adopt the ROW method to record a moving or still picture file to the optical disk 2.

FIG. 6 is a chart for explanation of the recording of a moving picture file and a still picture file to an optical disk having no files yet recorded therein, namely, a virgin disk, by the ROW method. Updating RMA information acquired from the optical disk 2 and held in the built-in memory, the microcomputer 4 performs padding to reserve UDF and VMG areas in the optical disk 2. Also, when an instruction for recording of a moving picture file is given from the user, the microcomputer 4 will define, by padding, areas for the subsequent titles VTSI and VTSM VOBS in the optical disk 2 as shown in FIG. 6(A). Also, with these operations, the microcomputer 4 will update the RMA data held in the built-in memory thereof.

Figure 6A:
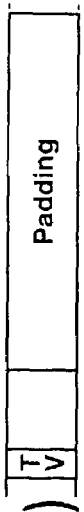
FIGS. 6(A) to (H) explain recording of an extension file by the optical disk drive shown in FIG. 4.
Figure 6B:
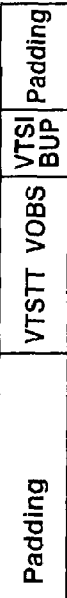
Figure 6C:
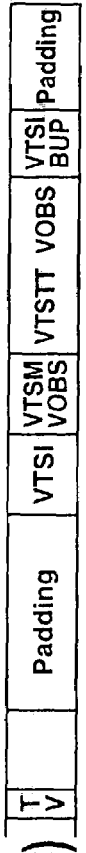

Given an instruction for starting the recording from the user, the microcomputer 4 will sequentially record real data in the moving picture file to define a VTSTT VOBS area, then generate management information including a start address, file size, recording data, etc., and record the management information to define a VTSI BUP area. Also, to record subsequent titles, the microcomputer 4 will reserve, by padding, areas for the titles VTSI and VTSM VOBS as shown in FIG. 6(B). Further, the microcomputer 4 will sequentially record the management information starting at a position a predetermined number of areas returned back from a position where recording of VTSTT VOBS has started to define areas for VTSI and VTSM VOBS, thereby completing recording of one title, as shown in FIG. 6(C). In these operations, the microcomputer 4 will record and hold the management information for the title in the built-in memory thereof.

For successive recording of moving picture files, the microcomputer 4 will similarly control the operation of each of the component blocks to sequentially record the moving picture files by the ROW method as in the conventional optical disk drive.

Through the above operations, the microcomputer 4 updates the RMA data held in the memory thereof appropriately, and rewrites the RMA in the optical disk 2 by the RAM data held in the memory at the time of ejection of the optical disk 2, power off, etc. Thus, even the record in the memory is lost, the optical disk drive 1 will be able to access any yet-to-finalize optical disk 2 with reference to the recorded RMA.

Note here that the microcomputer 4 will appropriately update the RMA data through updating of the management information among the RMA data held in the memory and perform the above operations by updating the RMA in the optical disk 2 according to the management table. It should also be noted that the management table is indicated with a reference TV in FIG. 6.

Note here that the management table TV is to manage the program area on the optical disk 2 and can record top and bottom addresses of VTSs recorded in the program area. The inner-circumferential area of the lead-in zone defined through the finalization and area not accessed by any reproduce-only optical disk drive (DVD player) are assigned to the management table TV.

Thus, the microcomputer 4 will record, to the optical disk 2, top and bottom addresses corresponding to the management table TV held in the memory thereof through recording of VTSs to the optical disk 2, and update the management table TV in the optical disk 2 according to the management table TV held in the memory in its free time and during ejection of the optical disk 2 as well.

Figure 6D:
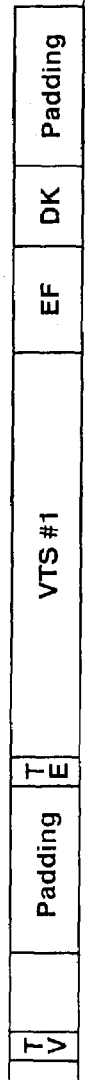

Given an instruction for recording of still pictures from the user, the microcomputer 4 will set a start address for real data at the top of an area reserved by padding. Also, supplied with a user's instruction for start of the recording, the microcomputer 4 will sequentially record still picture files being extension files (indicated with a reference EF in FIG. 6) as shown in FIG. 6(D). Further, the microcomputer 4 sequentially generates intermediate management information for provisional management of the still picture files until the finalization correspondingly to the recording of the still picture files and hold the information in the built-in memory thereof.

Furthermore, after having recorded a desired number of still picture files and when given a user's instruction for ending the recording of the still picture files, the microcomputer 4 will convert the intermediate management information held in the memory into a format of recording to the optical disk 2, and record the intermediate management information to reserve, by padding, areas for recording the subsequent titles VTSI and VTSM VOBS, as shown in FIG. 6(D). Thus, the microcomputer 4 will generate management information for all extension files to successively be recorded. Also, the microcomputer 4 will select a recording format according to the attribute of a file by recording a moving picture file in combination with corresponding management information in the order of management information, moving picture file and management information, while recording an extension file in combination with corresponding intermediate management information in the order of the extension file and intermediate management information and recording intermediate management information collectively for a plurality of files.

Figure 6E:
Figure 6F:
Figure 6G:
Figure 6H:
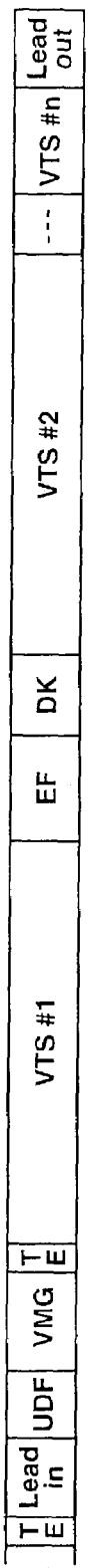

Thus, for recording a moving picture file next, the microcomputer 4 will record VTSTT VOBS and VTSI BUP by real data next to an area reserved by padding, and then reserve subsequent areas by padding, and record VTSI and VTSM VOBS back at the beginning, to thereby record one title, as shown in FIGS. 6(E) to 6(G). Also, for recording still picture files, the microcomputer 4 will similarly record them sequentially back at the top of padding to record the management data, and then reserve areas by padding. Further, given an instruction for finalization from the user, the microcomputer 4 will define UDF and VMG areas and lead-in and lead-out zones according to the management information, as shown in FIG. 6(H).

The microcomputer 4 will update the management table TV as above with these moving picture files correspondingly to the recording of the titles for the moving picture files. On the other hand, for the extension files, the microcomputer 4 will generate guide information for the extension files each time intermediate management information DK is recorded to the optical disk 2 and update extended information guide information TE recorded in a fixed area along the inner circumference of the optical disk 2 by the extension-file guide information. It should be noted that the "fixed area" means a predetermined area for recording the extension-file guide information TE. In this embodiment, of the areas initially reserved by padding, a clearance area where no UDF and VMG are allocated is used as such a "fixed area". Further, the microcomputer 4 will record top and bottom addresses of the extension-file guide information TE to the management table TV.

Note that the microcomputer 4 actually performs the above operations by the use of the memory thereof while reading and updating the optical disk 2 at the time of ejecting the optical disk 2, power off and in its free time. Also, the top address of the extension-file guide information is recorded only once to the management table TV at the time of recording the first intermediate management information DK since the extension-file guide information TE is recorded to the fixed area.

Thus, in the optical disk drive 1, the extension-file guide information TE can be detected according to the recorded management table TV and each extension file can be searched according to the extension-file guide information, so that a desired extension file can quickly be searched without having to scan the entire information recording area on the optical disk 2. Also, the extension-file guide information TE can be detected according to the management table TV for the moving picture files, so that the information recording area can effectively be used.

Note that the intermediate management information DK is required for reading of an extension file, and it is composed of attribute information as an extension indicative of the attribute of an extension file, address information indicative of an address of the extension file, file size information indicative of the size of the extension file, time information indicative of a date and time when the extension file was recorded to the optical disk 2, etc. As shown in FIG. 3, the intermediate management information DK includes, at the top thereof, management information CI for a collection of extension files EF1 to EF3 successively recorded following the information CI. It should be noted that the management information CI includes identification information indicative of a category, directory, etc. of files managed according to individual information EXF1 to EXF3 included next to the management information, whereby it is made possible to maintain the compatibility of the files with the file management system of the computer.

The individual information EX is composed of the name of a file, start address of the file, etc. The extension-file guide information TE includes an identification code, address as a pointer indicative of a start address of the management information CI, which is also the start address of the intermediate management information DK, etc.

Figure 3A:
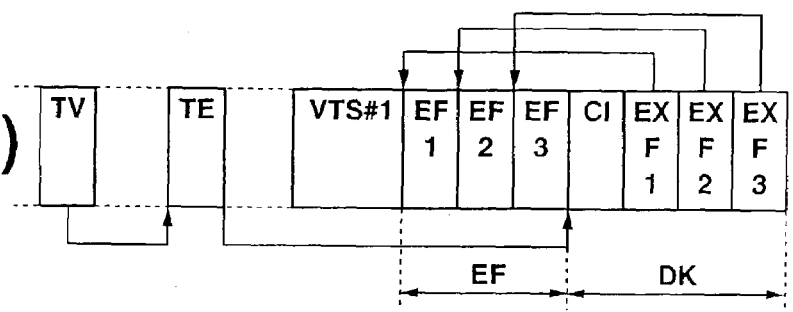
FIGS. 3(A) to (D) explain processing of management information in a first embodiment of the optical disk drive according to the present invention.

Thus, as shown in FIG. 3(A), when a title (VTS #1) for a moving picture file is recorded, the microcomputer 4 records top and bottom addresses of the title in the management table TV correspondingly to the recording of the title (VTS #1). When three still picture files EF1 to EF3 are recorded in the JPEG format in this condition, the microcomputer 4 will record the management information CI and individual information EXF1 to EFX3 for the still picture files EF1 to EF3 to record the intermediate management information DK. Also, the microcomputer 4 records the extension-file guide information TE and also updates the management table TV correspondingly to the recording of the guide information TE. It should be noted that the microcomputer 4 effects these operations by updating or otherwise processing information in consideration held in the memory, and actually updates the record in the optical disk 2 at the time of ejecting the optical disk 2 or at any other time. This will also be true in the subsequent steps of operations.

Figure 3B:
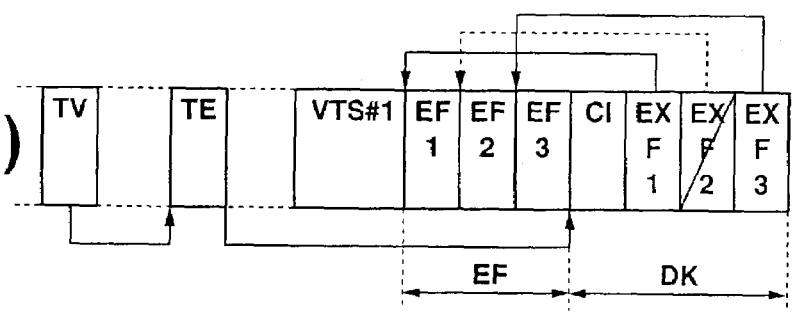

When the second recorded still picture file EF2 is deleted in this condition, the microcomputer 4 detects the extension-file guide information TE from the record in the management table TV and detects the address of corresponding intermediate management information DK from the guide information TE, as shown in FIG. 3(B). With the detection of the address, the microcomputer 4 changes the individual information EFX2 with the still picture file EF2 left in the optical disk 2 by actually deleting the individual information EXF2 or setting, for the individual information EXF2, a flag indicating that the individual information EXF2 is a meaningless information, to thereby set the recorded area of the still picture file EF2 as an unrecorded area. It should be noted that in this case, the microcomputer 4 will update the intermediate management information DK by overwriting the intermediate management information DK as a whole.

Figure 3C:
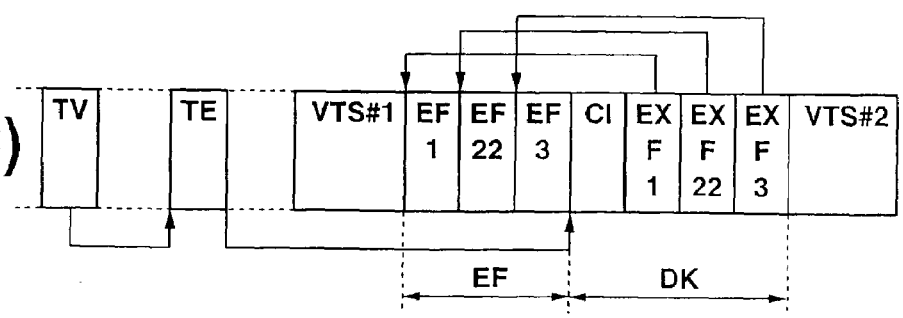

When given an instruction for recording a still picture file from the user, if the previously deleted still picture file EF2 used to be recorded at the top of the unrecorded area, the microcomputer 4 will similarly detect the extension-file guide information TE from the record in the management table TV, the address of corresponding intermediate management information DK from the guide information TE, and also the address of an area having been set as an unrecorded area from the recording of the individual information EFX22 in the intermediate management information DK, as shown in FIG. 3(C). Thus, the microcomputer 4 records the still picture file EF22 related to the user's instruction to the detected unrecorded area and overwrites the management information CI and individual information EXF1, EXF22 and EXF3 related to the still picture files EF1, EF22 and EF3, respectively, thereby updating the record of the intermediate management information DK. Further, when instructed by the user to delete the still picture file EF22, the microcomputer 4 will set the recorded area of the still picture file EF22 as an unrecorded area as having been described above with reference to FIG. 3(B).

The microcomputer records the intermediate management information DK as above. For recording the intermediate management information DK by additionally recording an extension file, however, the microcomputer 4 will generate intermediate management information DK for all intermediate management information DK for extension files already recorded in the optical disk 2 and record the intermediate management information DK1 to the optical disk 2, as shown in FIG. 7. Also, the microcomputer 4 updates the extension-file guide information TE for correspondence to the recording of the intermediate management information DK1.

Figures 7A, 7B:
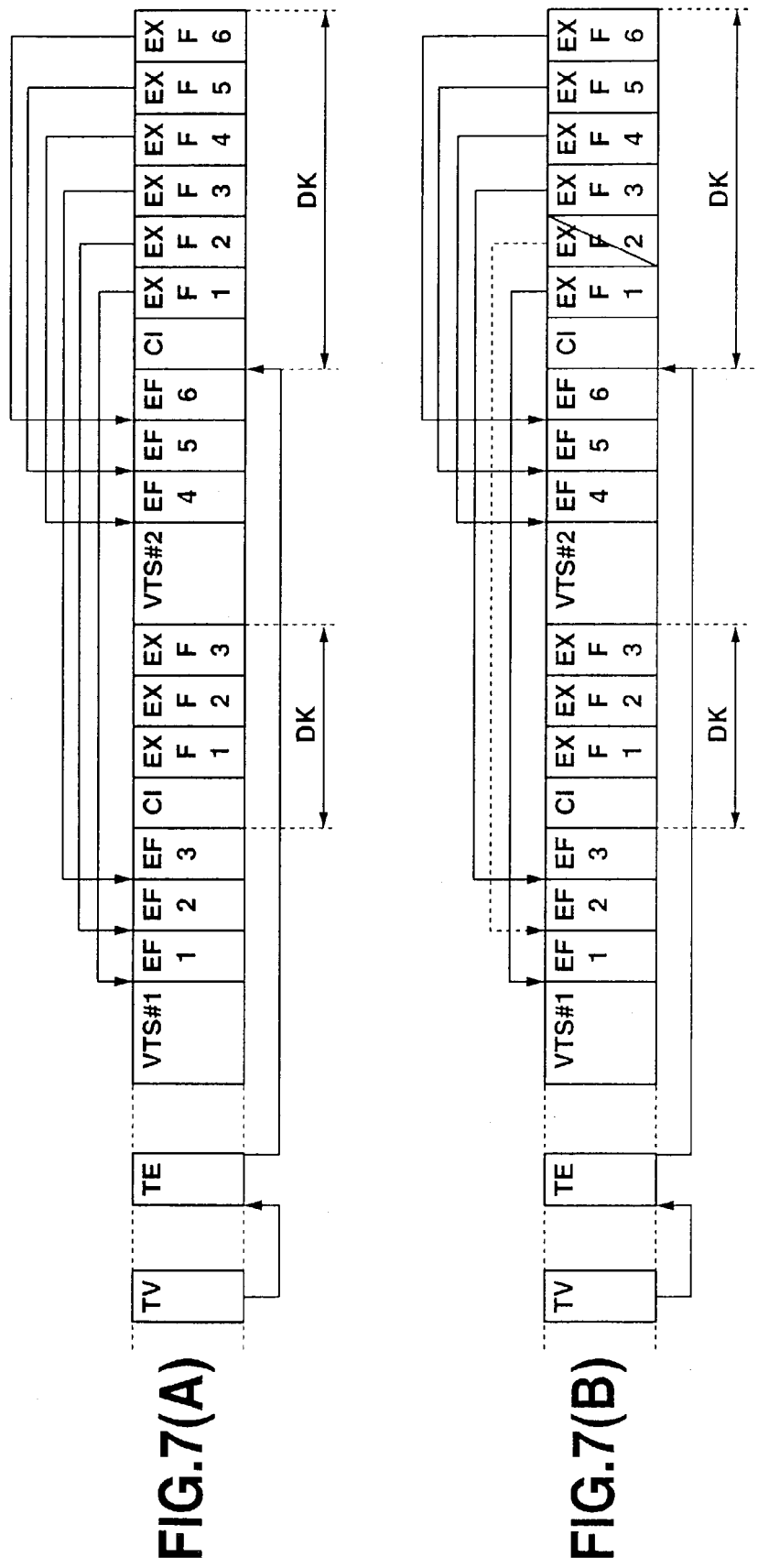
FIGS. 7(A) and (B) explain processing of the management information for additional recording of the extension file.

FIG. 7(A) shows recording of still picture files EF4, EF5 and EF6 next to one recorded title (VTS #2) after the aforementioned condition shown in FIG. 3(A). In this case, the microcomputer 4 generates management information CI and individual information EXF1 to EXF6 for the management information CI from the intermediate management information DK for the still picture files EF1, EF2 and EF3 held in the memory and information such as addresses of the still picture files EF4, EF5 and EF6, records the thus generated information CI and individual information EXF1 to EXF6 to the optical disk 2, and also updates the extension-file guide information TE.

Thus, the microcomputer 4 will update the existent record of the still picture files EF1, EF2 and EF3 in the optical disk 2 so that they can be accessed based on the individual information EFX1 to EXF3 corresponding to the above newly recorded intermediate management information DK1. As shown in FIG. 7(B), the microcomputer 4 will update or delete the newly recorded still picture files EF4 to EF6 and also the already recorded still picture files EF1 to EF3 by processing the individual information EXF1 to EXF6 corresponding to the newly recorded intermediate management information DK1.

Figure 3D:
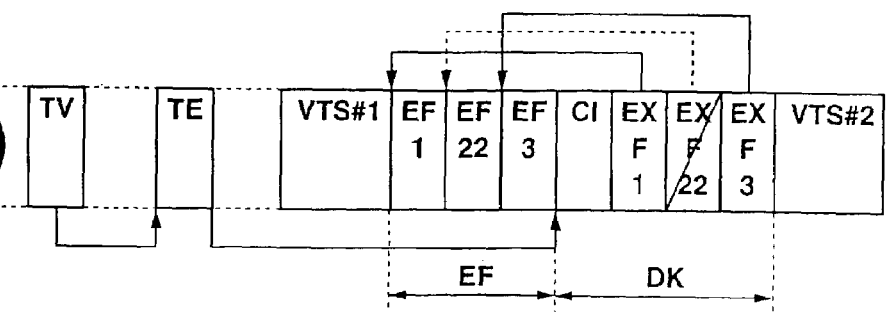

Thus, when instructed from the user to finalize the optical disk 2 having the extension files recorded therein as above, the microcomputer 4 will generate UDF data from the management information (VTSI and VTSTT VOBS) for all the titles having thus been generated with reference to the management table and intermediate management information for all the extension files, and record the UDF data to the optical disk 2, as shown in FIG. 3(D). Also, the microcomputer 4 will generate VMG data from only the management information (VTSI and VTSTT VOBS) for all the titles, and record it to the optical disk 2. It is important to note that the UDF and VMG data are generated according to the intermediate management information held in the memory or the like. Also, having recorded the UDF and VMG in this way, the microcomputer 4 will define lead-in and lead-out zones. It should also be noted that the microcomputer 4 will record the UDF and VMG data, define the lead-in and lead-out zones and record the intermediate management information, all by outputting the corresponding data to the DVD signal processor 14.

Figure 8:
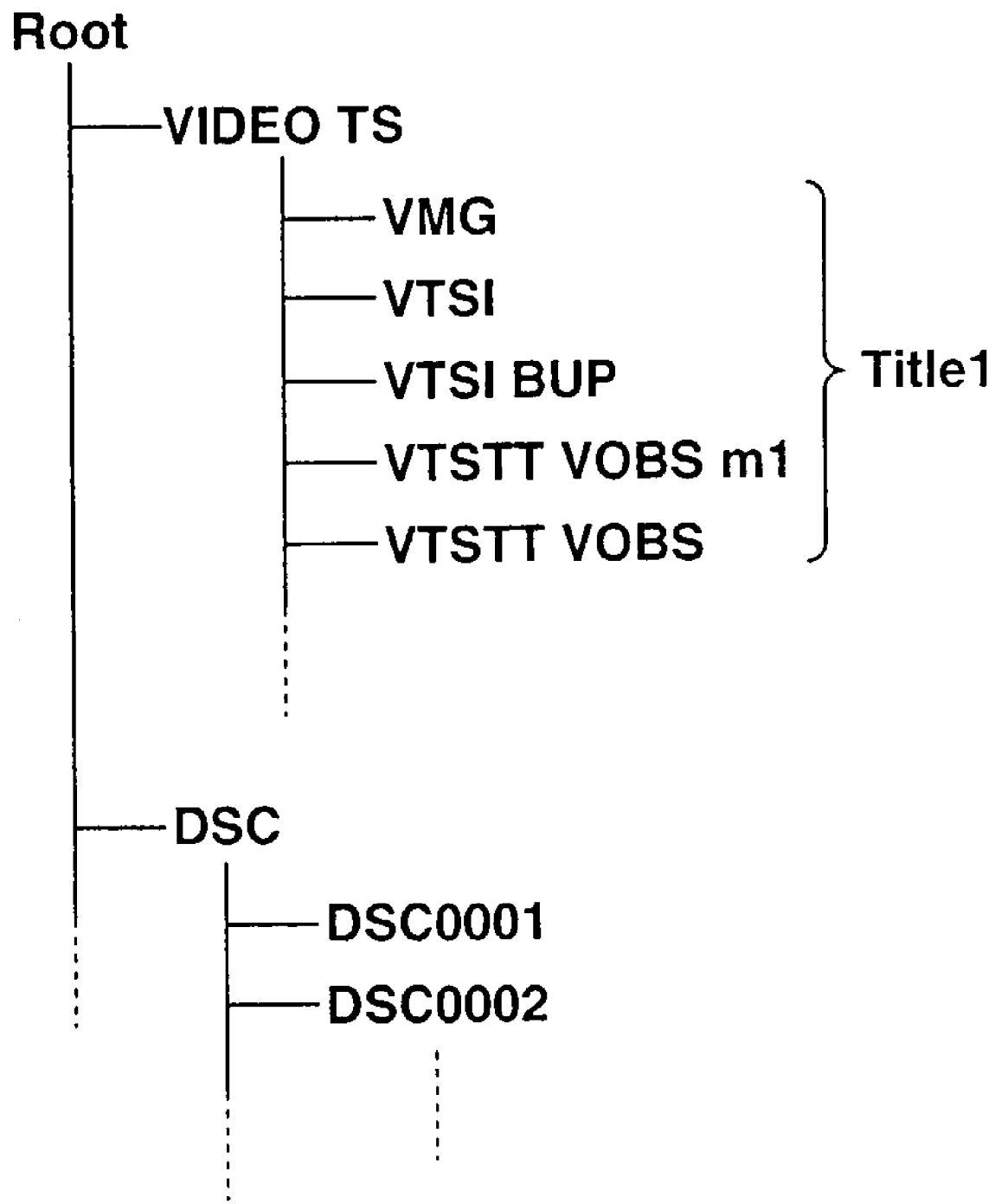
FIG. 8 explains the directory structure in the optical disk.

Therefore, in this embodiment, the UDF data for management of the computer will include management information by which also an extension file can be recognized and accessed but the VMG data for management of DVD reproduction will include no extension file-related information. As shown in FIG. 8, the microcomputer 4 will reproduce the UDF data for management of the computer to generate UDF in a separate folder in the same hierarchical layer as a DVD title so that only extension files will be displayed. For the intermediate management information DK having been described above with reference to FIG. 6, the microcomputer 4 will generate UDF with no file name, address information such as an address, etc. being stated. It should be noted that the microcomputer 4 will of course generate the UDF so that each extension file can be accessed similarly to titles VTSI, VTSM VOBS, etc. Thus, in this embodiment, when the optical disk 2 is reproduced by a computer, a file of provisional intermediate management information which is meaningless in reproduction of the optical disk 2 by the computer is made invisible from the user so that the optical disk drive 1 can accordingly be improved in operability.

Thus, the conventional optical disk drive for DVD can only read moving picture files recorded in the optical disk 2 by recording VMG data to the optical disk 2. On the contrary, in the optical disk drive 1, the microcomputer 4 acquires UDF and VMG data in step SP3 in FIG. 5 to provide a system control for access to each of extension files based on the UDF data, to thereby reproduce the extension files as well. It should be noted that in FIG. 8, "Root" is a root directory, "VIDEO TS" is a moving picture folder and "DSC" is an extension file folder. Also, "DSC0001" and "DSC0002" are extension files, respectively.

Figure 9:
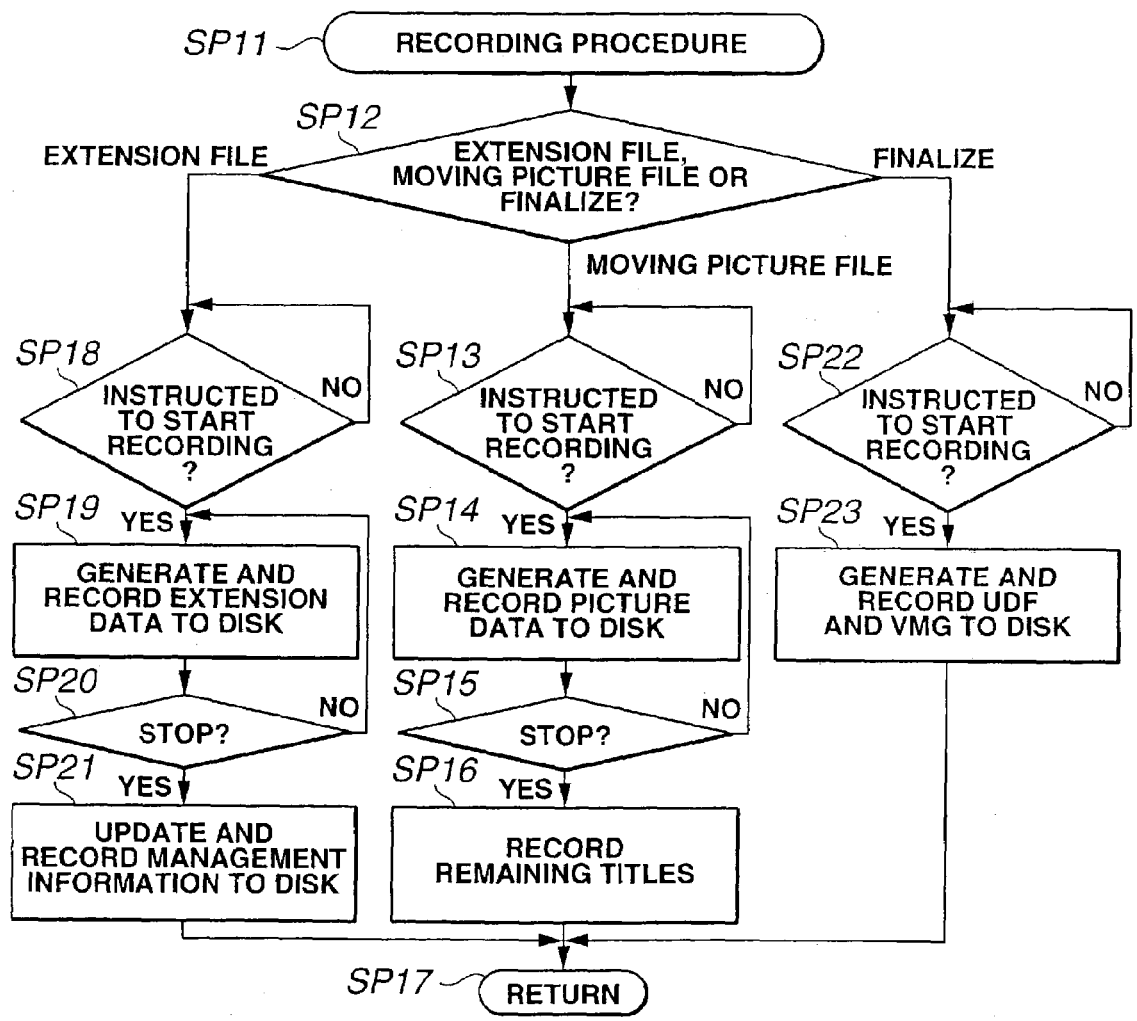
FIG. 9 shows a flow of operations made in the recording procedure shown in FIG. 5.

FIG. 9 shows a flow of operations in the recording procedure having been described above with reference to FIGS. 5 and 6. When this recording procedure is started, the microcomputer 4 goes from step SP11 to SP12 where it will judge which the user has instructed to do, recording of a moving picture file, recording of a still picture file or finalization.

When the user instruction is to record a moving picture file, the microcomputer 4 goes from step SP12 to SP13 where it will judge whether the user has instructed to start the recording. If the result of judgment in step SP13 is negative, the microcomputer 4 will repeat the operation in step SP13. If the above result of judgment is affirmative, the microcomputer 4 goes from step SP13 to SP14 where it will record real data as having been described above with reference to FIG. 5. Further, the microcomputer 4 goes to step SP15 where it will judge whether the user has instructed to stop the recording. If the result of judgment in step SP15 is negative, the microcomputer 4 will go back to step SP14.

This, the microcomputer 4 repeats the operations in steps SP14, SP15 and again in SP14, thereby sequentially recording real data. When the above result of judgment is affirmative, the microcomputer 4 will complete the recording of VTSTT VOBS data with exiting the recording of real data.

Next, the microcomputer 4 goes to step SP16 where it will sequentially define VTSI BUP, VTSI and VTSM VOBS areas in the optical disk 2, thereby recording one VTS, and then goes to step SP17 where it will exit this recording procedure.

On the other hand, when the user's instruction is to record a still picture file, the microcomputer 4 goes from step SP12 to SP18 where it will judge whether the user has instructed to start the recording. If the result of judgment in step SP18 is negative, the microcomputer 4 will repeat the operation in step SP18. On the contrary, when the above result of judgment is affirmative, the microcomputer 4 goes from step SP18 to SP19 where it will record an extension file for the still picture file as having been described above with reference to FIGS. 5 and 6. Further, the microcomputer 4 goes to step SP20 where it will judge whether the user has instructed to stop the recording. If the result of judgment in step SP20 is negative, the microcomputer 4 will go back to step SP19. Thus, the microcomputer 4 repeats the operations in steps SP19, SP20 and again in SP19 to sequentially record the still picture files. If the above result of judgement is affirmative, the microcomputer 4 terminates the recording of still picture files and goes to step SP21 where it will record intermediate management information, and goes to step SP17 where it will exit this recording procedure.

When the user's instruction is to record data related to finalization of the optical disk 2, the microcomputer 4 goes from step SP12 to SP22 where it will judge whether the user has instructed to start the recording. If the result of judgment in step SP22 is negative, the microcomputer 4 will repeat the operation in step SP22. When the above result of judgment is affirmative, the microcomputer 4 goes from step SP22 to SP23 where it will finalize the optical disk 2 as having been described above with reference to FIGS. 5 and 6, and then goes to step SP17 where it will exit this procedure.

Figure 5:
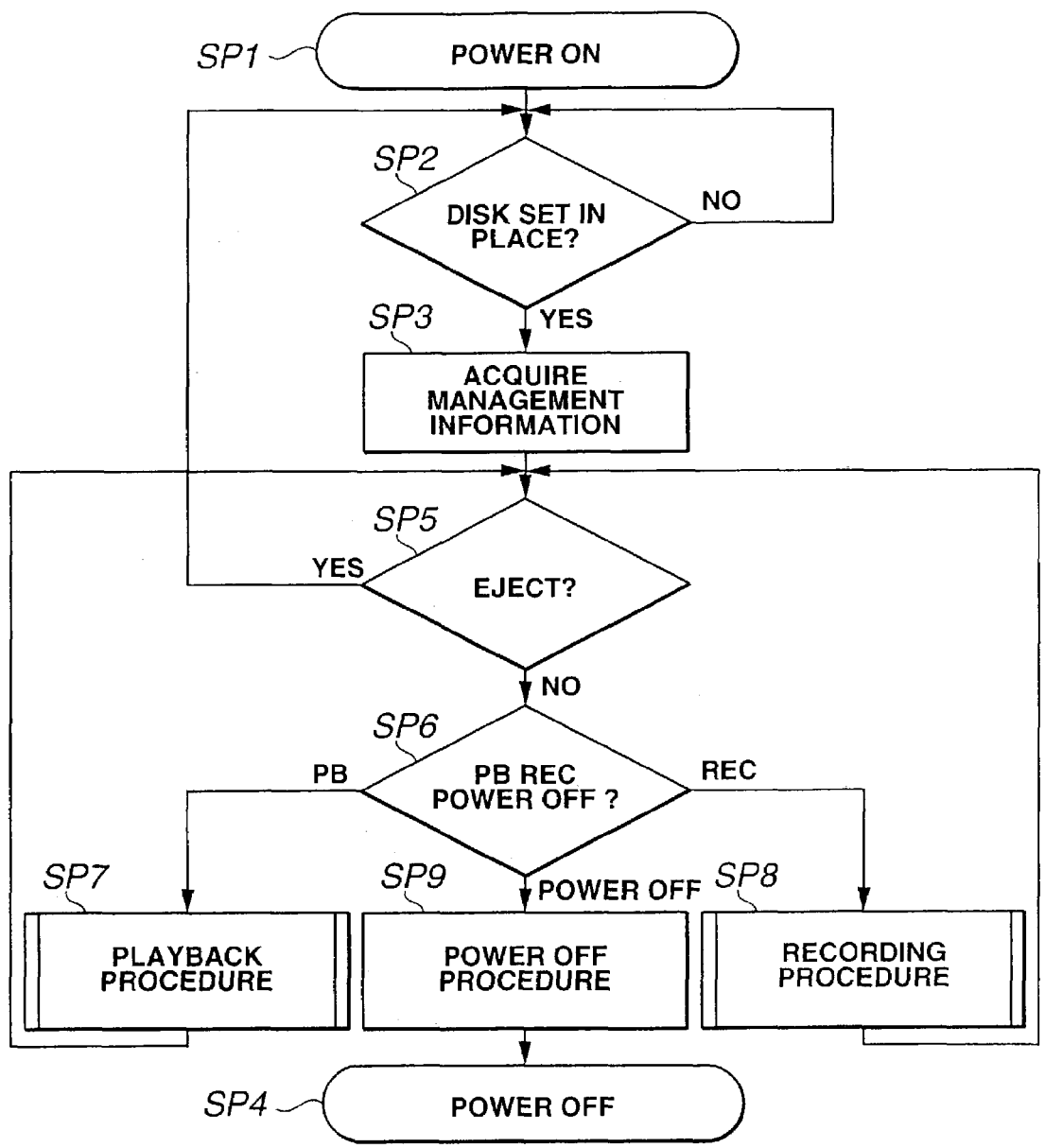
FIG. 5 shows a flow of operations made in the recording and recording procedures performed in the optical disk drive in FIG. 4.
Figure 10:
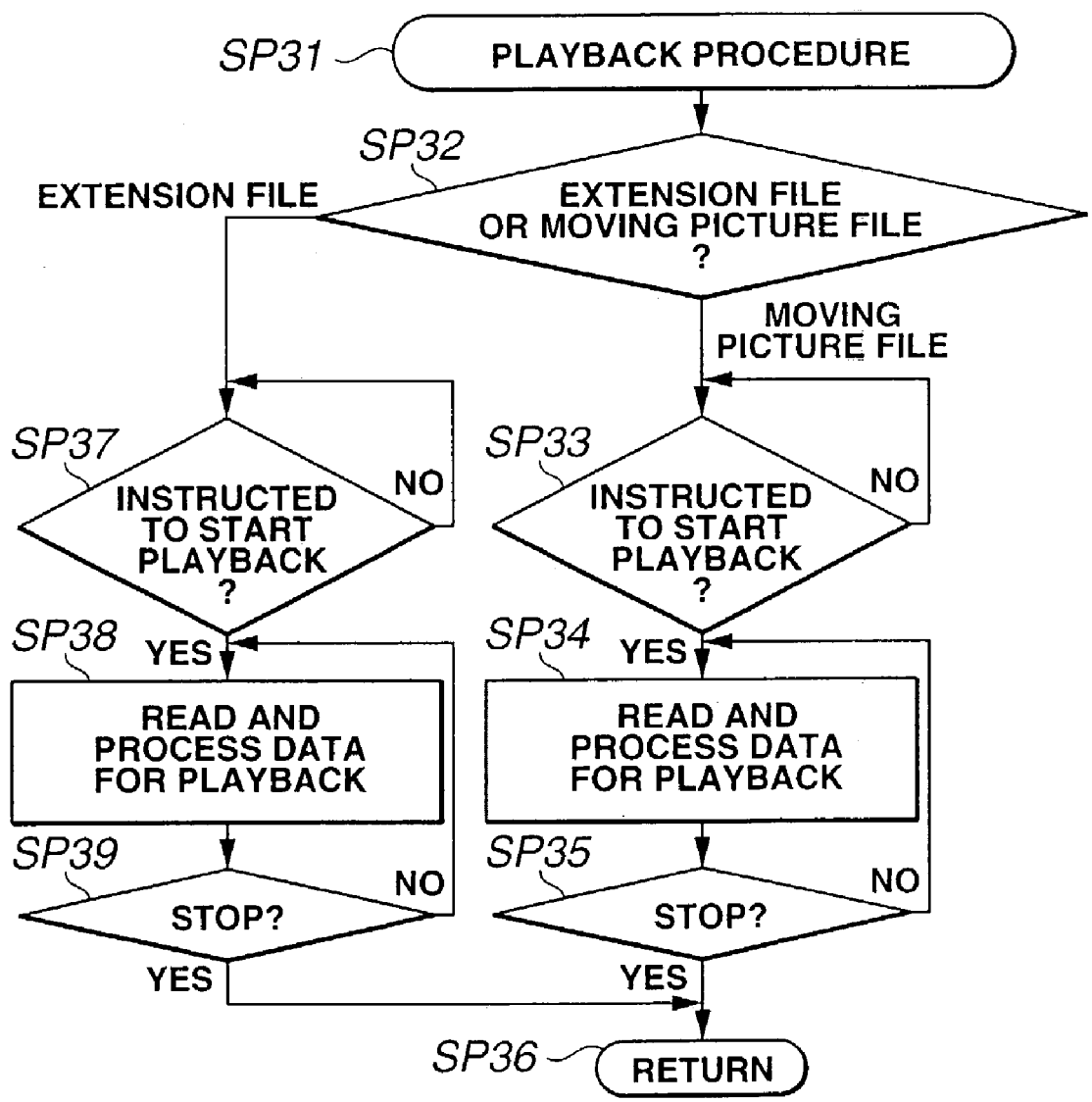
FIG. 10 shows a flow of operations made in the recording procedure shown in FIG. 5.

FIG. 10 shows a flow of operations included in the reproducing procedure shown in FIG. 5. When this reproducing procedure is started, the microcomputer 4 goes from step SP31 to SP32 where it will judge which the user has instructed to read, a moving picture file or a still picture file.

When the user's instruction is for reproduction of a moving picture file, the microcomputer 4 goes from step SP32 to SP33 where it will judge whether the user has instructed to start the reproduction. If the result of judgment is negative, the microcomputer 4 will repeat the operation in step SP33. When the above result of judgment is affirmative, the microcomputer 4 goes from step SP33 to SP34 where it will provide a system control for reproducing a moving picture file designated by the user with reference to the management information held in the memory.

That is, when the optical disk 2 is a finalized one, the microcomputer 4 will detect the address of a file in consideration on the basis of the VMG data held in the built-in memory thereof, and instruct each of the components of the optical disk drive 1 to read the file from the address. On the other hand, in case the optical disk 2 is not any finalized one, the microcomputer 4 will detect the address of the file in consideration on the basis of record of the management table TV held in the memory and record of corresponding titles VTSI and VTSTT VOBS, and instruct each of the components of the optical disk drive 1 to read the file from the address.

After instructing the reproduction as above, the microcomputer 4 goes to step SP35 where it will judge whether the user has instructed to stop the reproduction. If the result of judgment in step SP35 is negative, the microcomputer 4 will return to step SP34. Thus, the microcomputer 4 repeats the operations in steps SP34, SP35 and again SP34 to sequentially read moving picture files designed by the user. On the other hand, when the above result of judgment is affirmative, the microcomputer 4 will terminate the reproducing operation, and goes to step SP36 where it will exit the reproducing procedure.

On the other hand, in case the user's instruction is to read an extension file, the microcomputer 4 goes from step SP32 to SP 37 where it will judge whether the user has instructed to start the reproduction. If the result of judgment is negative, the microcomputer 4 will repeat the operation in step SP37. On the contrary, when the result of judgement is affirmative, the microcomputer 4 goes from step SP37 to SP38.

In case the optical disk 2 is a finalized one, the microcomputer 4 will detect the address of a file in consideration on the basis of the UDF data held in the memory thereof, and instruct each of the components of the optical disk drive 1 to read the file from the address. On the other hand, in case the optical disk 2 is not any finalized one, the microcomputer 4 will detect the address of the file in consideration on the basis of record of the management table held in the memory, record of the guide information and corresponding intermediate management information, and instruct each of the components of the optical disk drive 1 to read the file from the address.

After instructing the reproduction as above, the microcomputer 4 goes to step SP39 where it will judge whether the user has instructed to stop the reproduction. If the result of judgment in step SP 39 is negative, the microcomputer 4 will go back to step SP38. Thus, the microcomputer 4 repeats the operations in steps SP38, SP39 and again in SP38 to sequentially read still picture files designated by the user. On the contrary, if the above result of judgment is affirmative, the microcomputer 4 terminates the reproducing operation, and goes to step SP36 where it will exit the reproducing procedure.

Thus, in this embodiment, the microcomputer 4 provides a management information generating means for generating management information for a file to be recorded, and the DVD signal processor 14, random access memory 15, analog front end block 16, motor amplifier 18, optical head 19 and spindle motor 20 form together a recording means for recording the file in combination with the management information for the file to the program area on the optical disk 2. Also, the microcomputer 4 provides a control means for controlling the operations of the management information generating means and recording means, and it forms together with the compress/expand block 6, header information processor 7, DVD signal processor 14, random access memory 15, analog front end block 16, motor amplifier 18, optical head 19 and spindle motor 20 a reproducing means for reading a file of each attribute recorded in the optical disk on the basis of the management information recorded in the optical disk 2 in combination with the file.

(1-2) Function of the First Embodiment

The optical disk drive 1 constructed as having been described above with reference to FIG. 4 functions as will be described herebelow:

When the optical disk 2 is loaded by the user into the optical disk drive 1 turned on or when the optical disk drive 1 is turned on with the optical disk 1 loaded in the optical disk drive 1, the microcomputer 4 controls the DVD signal processor 14 and motor amplifier 18 to drive the sled motor 21 in order to move the optical head 19 toward the inner circumference of the optical disk 2. Further, a laser beam is projected from the optical head 19 to the optical disk 2. A return light is detected by the optical head 19 and is sequentially processed through the analog front end block 16 and microcomputer 4. The optical head 19 undergoes tracking control and focus control by the microcomputer 4 via the DVD signal processor 14 and motor amplifier 18. Also, the detected return light is processed by the DVD signal processor 14 to read data from the optical disk 2. In the optical disk drive 1, various kinds of information recorded along the inner circumference of the optical disk 2 are acquired by the microcomputer 4 through the above series of operations and held in the memory built in the microcomputer 4.

In case the optical disk 2 is a read-only optical disk formed by stamping or in case it is a finalized one having only moving picture files recorded therein, the microcomputer 4 will acquire VMG data recorded along the inner circumference of the optical disk 2 and which is management information for a DVD player through the above series of operations. Thus in the optical disk drive 1, when it is instructed by the user to reproduce the optical disk 2, the spindle motor 20 is driven according to the VMG data by means of the DVD signal processor 14 and motor amplifier 18 to move the optical head 19 to the address of a user-designated title (seek operation), and with the optical head 19 undergoing the tracking control and focus control on the basis of the detected return light, the detected return light is sequentially processed through the DVD signal processor 14, header information processor 7 and compress/expand block 6 to read video data composed of moving pictures. More particularly, a read signal being a result of return light detection and which varies in level correspondingly to pit trains on the optical disk 2 is processed by the analog front end block 16 to produce read data, and the read data is decoded, deinterleaved and error-corrected by the DVD signal processor 14. Also, the error-corrected read data is supplied to the header information processor 7 where the header is removed from the data and the microcomputer 4 is informed of the header. Further, the read signal is supplied to the compress/expand block 6 and broken by the multiplexer 10 into video and audio data. The video data is released by the video processor 8 from the MPEG-compressed state and displayed on the monitor 12 or supplied to an external apparatus via the video/audio encoder 13. On the other hand, the audio data is expanded by the audio processor 11 and then supplied to the monitor 12 for monitoring or supplied to the external apparatus via the video/audio encoder 13.

In case the optical disk 2 is a rewritable virgin disk, however, when the optical disk 2 is loaded into the optical disk drive 1 or when the optical disk drive 1 is turned on, the microcomputer 4 will access the optical disk 2 to acquire RMA data from the latter. In the optical disk drive 1, when the user selects the moving picture capture mode, the microcomputer 4 will update the RMA data held in the memory thereof (as shown in FIG. 3) and define, by padding, areas for UDF and VMG and also areas for VTSI of VTS.

When the user instructs to start the recording in this condition, video and audio data are sequentially supplied from the video input block 3 and audio input block 5 and the video data is compressed by the video processor 8 with the MPEG technique while the audio data is compressed by the audio processor 11. Further, the video and audio data thus compressed are multiplexed by the multiplexer 10 and then the multiplexed data has a header added thereto by the header information processor 7. In the DVD signal processor 14 provided downstream, the multiplexed data has an error correction code added thereto, and undergoes interleaving and encoding. According to the result of this data processing, the analog front end block 16 will set an amount of laser beam emitted from the optical head 19 to the optical disk 2. Thus, pits are sequentially formed on the optical disk 2 to sequentially record moving video data composed of moving pictures.

In the optical disk drive 1, when the user instructs to stop the recording, a series of operations in the compress/expand block 6 and the like is stopped by the microcomputer 4 to cease the recording of the video data and then the management information for the moving picture file thus recorded is recorded to the optical disk 2. Namely, in the optical disk drive 1, the microcomputer 4 will generate management information from the address, file size, recording date, etc. of the moving picture data, and supply the management information to the DVD signal processor 14 and record it to the optical disk 2 so that the management information will be recorded next to the video data, whereby VTSI BUP area is defined. Then, areas for VTSI and VTSM VOBS of a next VTS are defined by padding, the optical head 19 is caused to seek for the existing VTSI and VTSM VOBS. Similar management information is supplied to the DVD signal processor 14 and recorded to the optical disk 2 to define the intended VTSI and VTSM VOBS areas.

In the optical disk drive 1, video data composed of moving pictures is recorded for one title. Thus, in the optical disk drive 1, for recording a moving picture file, management information and the file are recorded in the DVD video format in which management information composed of VTSI, management information composed of VTSM VOBS, moving picture file and management information composed of VTSI BUP are laid successively. When the user then instructs to record moving pictures, the similar operations are repeated to sequentially record titles to the optical disk 2.

Upon completion of recording moving pictures for one title as above, addresses indicative of the top and bottom addresses of the titles are recorded to the management table in the inner-circumferential RMA area of the optical disk 2.

In case an optical disk having such titles sequentially recorded therein as above and not yet finalized is loaded into the optical disk drive 1, the management table is acquired by initially acquiring the RMA data, the management information having been recorded in combination with the titles are sequentially acquired by scanning the optical disk 2 according to the management table, and are held in the memory built in the microcomputer 4. Further, a moving picture file the user has instructed to read is read on the basis of the management information thus acquired.

In the optical disk drive 1, when titles are recorded to the optical disk 2 as above and the user instructs to finalize the optical disk 2, UDF and VMG data are generated according to the management information recorded in combination with the titles in the memory of the microcomputer 4 on the basis of the record in the management table and recorded to the inner-circumferential area defined on the optical disk 2, and also the lead-in and lead-out zones are defined. Thus, this optical disk can be set up for reproduction by a DVD player which supports only the ordinary DVD format.

On the other hand, in case the user has selected the still picture recording mode, UDF and VMG areas will be defined in a virgin disk as in the recording of moving pictures. Also, in the optical disk drive, the mode of operation of the imaging means is switched to the still picture mode and the operation mode of the compress/expand block 6 is switched to the operation mode for a JPEG-based data compression.

When the user instructs to start the recording of still pictures in this condition, video data composed of still pictures supplied from the video input block 3 are compressed by the video processor 8 of the compress/expand block 6 into the JPEG format, and then multiplexed by the multiplexer 10 with audio data supplied from the audio processor 11. Thus, in the optical disk drive 1, the still pictures-composed video data, not any moving pictures-composed video data, are provided for recording and sequentially recorded to the optical disk 2 as in the recording of the moving pictures.

In this optical disk drive 1, for recording moving pictures, areas for VTSI and VTSM VOBS are initially defined for recording real data, but for recording still pictures, real data composed of the still pictures are recorded back at the top of areas reserved by padding. Namely, for recording still pictures, it is not necessary to reserve areas such VTSI and VTSM VOBS. Also, when the user instructs to record still pictures, subsequent still pictures are recorded to the optical disk 2 as above. At each recording, the address of each file is recorded to the memory of the microcomputer 4.

In the optical disk drive 1, when the recording of still pictures is stopped by the user changing the mode of operation or otherwise with a desired number of still picture files having been recorded to the optical disk, the management information composed of addresses etc. held in the memory is recorded, as provisional intermediate management information intended for use until the finalization, in successive areas for the plurality of still picture files. Thus in the optical disk drive 1, for recording other files than any moving picture file, the files and management information for them will be recorded in the order of a file and management information, and a format for recording the files and management information is selected depending upon the attribute of the files to be recorded.

As above, the optical disk drive 1 can also record still picture files not defined in the DVD video format to the optical disk 2. Also, when the optical disk having the still picture files thus recorded therein is loaded into an optical disk drive which supports only the DVD video format, the management information having been recorded according to the DVD video format such as VTSI or the like is detected through a search made at the time of disk loading, and VTS is read based on the management information. Thus, the files of still pictures thus recorded and management information for the files will not possibly influence the reading of any moving pictures. Therefore, any ordinary DVD player can read a moving picture file from the optical disk having the moving picture file thus recorded therein.

In the optical disk drive 1, such intermediate management information DK (as shown in FIG. 3) will collectively be laid for a plurality of files recorded successively and the management information CI providing a total control be recorded. After that, individual information EXF including a top address of each file and a file name will be recorded, and the top address of the intermediate management information DK be recorded as extension-file guide information TE to a fixed area along the inner circumference of the optical disk 2. Further, the address of the extension-file guide information TE will be recorded to the management table TV.

Thus, an optical disk drive which also supports other than the moving picture files can read still picture files. That is, in the optical disk drive 1 having the aforementioned optical disk 2 loaded therein, the optical disk 2 will be searched with reference to the management table to read VTS and VTSM VOBS data as well as the intermediate management information DK for the still picture files from the optical disk 2, and the management information DK be also held in the memory of the microcomputer 4.

Thus, the moving and still picture titles recorded in the optical disk 2 under the user's instruction can be provided to the user. Also, when the user instructs to read moving pictures, the optical disk drive 1 can read the moving picture files on the basis of the VTS and VTSM VOBS data as having been described concerning the read-only optical disk.

On the other hand, when the user instructs to read a still picture file, the address etc. of the file will be detected on the basis of the intermediate management information DK held in the memory of the microcomputer 4, data recorded in the optical disk 2 be sequentially read according to the result of detection, and processed through the operations similar to those in reading the moving pictures. In the optical disk drive 1, to process the read data including the still pictures in processing of the read data, the operation of the video processor 8 is changed by the microcomputer 4 to expand the video data having been compressed according to the JPEG, and video data including the still pictures is monitored on the monitor 12 and further can be supplied from the video/audio encoder 13 to an external apparatus.

Generally, the still picture file is smaller in size than the moving picture file. In the optical disk drive 1, however, intermediate management information as such management information is generated and recorded for a plurality of files as shown in FIG. 3. Thus in the optical disk drive 1, since an extension file composed of such still picture files or the like is recorded, it is possible to minimize the reduction of recording areas due to the recording of management files.

Also, the intermediate management information for a plurality of files is collectively recorded for each file type being the attribute of a file, whereby the operations for search and finalization (which will be described in detail later) can be simplified.

Especially, since addresses of such intermediate management information DK vary due to recording of various types of files, it is possible that the intermediate management information will be recorded for each of many files. The variation in addresses of the intermediate management information can be accommodated by recording the management table for them, but in case each extension file is to be recorded with only the management table provided for the extension file as in recording of moving picture files, however, if many extension files are recorded to the optical disk, so many management tables cannot be provided for the extension files. In this embodiment, however, since the guide information TE for extension files are managed by the management table and the management information CI for collectively managing successively recorded extension files is managed by the extension-file guide information TE, such an irregularity of addresses and recording of many files can be accommodated simultaneously.

Also, since the address (guide information) TE of the intermediate management information DK is recorded in such a management table, an extension file can be accessed simply and quickly by accessing the optical disk 2 with reference to the address information TE. Also, by utilizing the management table TV for moving picture files as above, it is possible to prevent the information recording area from being consumed due to separate generation of such a kind of table for each extension file, and thus to use the information recording area correspondingly more effectively.

In the optical disk drive 1, such extension files are recorded each in combination with intermediate management information DK for the file. Thus, in case any new intermediate management information DK is to be recorded, existent intermediate management information DK in the optical disk 2 will be updated in connection with the new one as will be known from FIG. 7. Also, because of the last updating of the intermediate management information DK as above, any extension file is updated or deleted. Thus, in the optical disk drive 1, even if multiple extension files are discretely recorded, an extension file in consideration can be accessed by acquiring the intermediate management information in one place, which also enables the optical disk drive 1 to access the optical disk 2 quickly.

With the above operations, the optical disk drive 1 is operated by the user to sequentially record moving and still picture files to a so-called virgin disk, an optical disk having only moving pictures recorded therein but not yet finalized and an optical disk having moving and still picture files recorded therein but not yet finalized.

On the other hand, when the user instructs to finalize any of the above optical disks having moving and still pictures recorded therein as above, UDF data for a computer is generated based on the management information and intermediate management information, acquired from the optical disk with reference to the management table and held in the memory of the microcomputer 4, as well as on the management information and intermediate management information generated by recording moving and still pictures and held in the memory, and the UDF data is recorded to a pre-defined area on the optical disk 2. Also, VMG data for a DVD player is generated according to only the management information for the moving picture file, and similarly recorded to the optical disk 2.

Thus in the optical disk drive 1, management information for all files recorded on the optical disk 2 will be recorded collectively in combination with the files to the UDF area for recording the first management information, of the management information recording area on the optical disk 2, while management information for only a moving picture file having a specific attribute, recorded in the optical disk 2, will be recorded in combination with the moving picture file to the VMG area intended for a DVD to record the second management information.

Thus, when the optical disk 2 finalized as above is reproduced by a DVD player, files recorded in the optical disk 2 will be read with reference to the DVD-oriented VMG area, whereby it is possible to positively read the DVD video-formatted moving pictures without being influenced by recording of the files such as still picture files.

When reproducing such a finalized optical disk by a computer, since the UDF is defined in a file management format corresponding to the file management system of the computer and the computer will read each file based on the UDF (as shown in FIG. 7), it is possible to read the moving picture file as well as the still picture file.

(1-3) Effect of the First Embodiment

In the optical disk drive 1 constructed as having been described in the foregoing, the address of management information can be identified with reference to the management table recorded in a fixed area on the optical disk and the management information recorded in combination with a file is converted in format according to the attribute of the file to permit recording also a still picture file other than a moving picture file, for example, which leads to an effective utilization of the information recording area and thus a quick search over the recording area on the optical disk.

Also, the address of the guide information for an extension file by which the address of the management information for the extension files can be identified is set in an inner-circumferential area on an optical disk where a first file starts being recorded, whereby it is made possible to record also the guide information in a fixed area. Thus, the extension-file guide information can be accessed independently of the management table to identify the address of the management information, which also leads to an effective utilization of the information recording area and thus a quick search over the recording area on the optical disk.

That is, a moving picture file is recorded in a sequence of management information, the file, backup information for the management information with the DVD video format being applied to the file and management information. On the other hand, any file other than a moving picture file is recorded in the order of the file and management information, and thus a file not defined in the DVD video format can be recorded without any influence on the reading of the moving picture file.

For recording management information for an extension file additionally recorded, management information for existing extension files are collectively recorded and the guide information for the extension files are updated correspondingly to the recording of the additional extension file and corresponding management information. Thus, by reading one management information piece, it is possible to identify the addresses of all the extension files recorded in the optical disk, and accordingly, the optical disk 2 can be prevented from being accessed frequently.

Also, by reading files of different attributes from the optical disk on the basis of the management information for other than the moving picture files recorded as above, any other file than a moving picture file can also be read for utilization.

Also, by collectively recording, under the user's instruction, management information in combination with all files recorded in the optical disk to the first management information recording area and management information in combination with only files having a specific attribute to the second management information recording area, it is possible to read the moving picture file by some ordinary DVD players and all the files of moving and still pictures by some computers.

(2) Second Embodiment

FIGS. 11 and 12 explain together the recording of intermediate management information in a second embodiment of the optical disk drive according to the present invention in comparison with that having been described above concerning the first embodiment with reference to FIGS. 3 and 7. In the second embodiment of the optical disk drive, guide information TE for extension files is recorded along with intermediate management information DK for the file at the end of a last recorded extension file. It is important to note that the second embodiment of the optical disk drive is constructed identically to the optical disk drive 1 according to the first embodiment having been described in the foregoing except for the handling of the extension-file guide information TE. Therefore, the same aspects of this second embodiment as those of the optical disk drive 1 will not be described any longer.

Figure 11A:
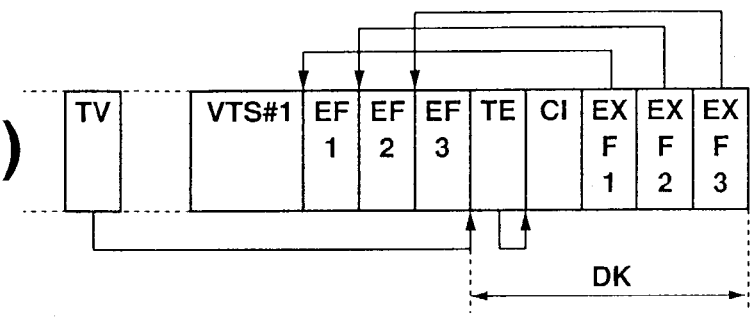
FIGS. 11(A) to (D) explain processing of the management information in a second embodiment of the optical disk drive according to the present invention.

As shown in FIG. 11(A), the microcomputer in this optical disk drive records extension files EF1, EF2 and EF3, then records guide information TE for the extension files, and further records intermediate management information DK composed of management information CI and individual information EXF1 to EXF3. Also, the microcomputer will record the top address of the guide information TE thus recorded to the management table TV.

Figure 11B:
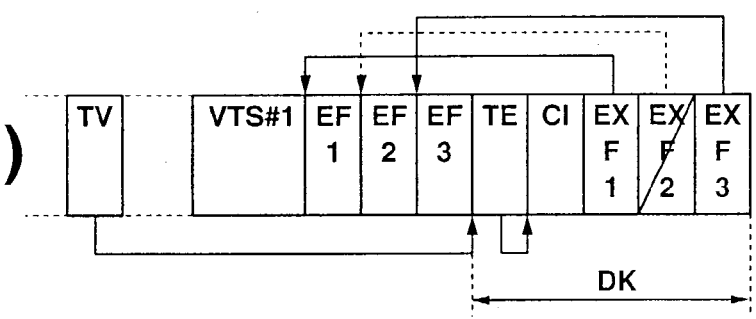
Figure 11C:
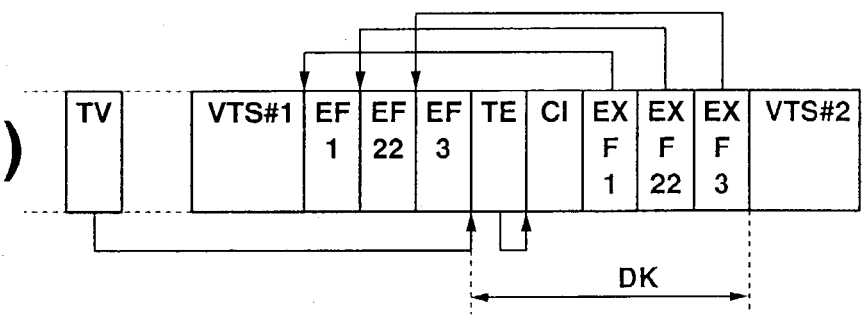
Figure 11D:
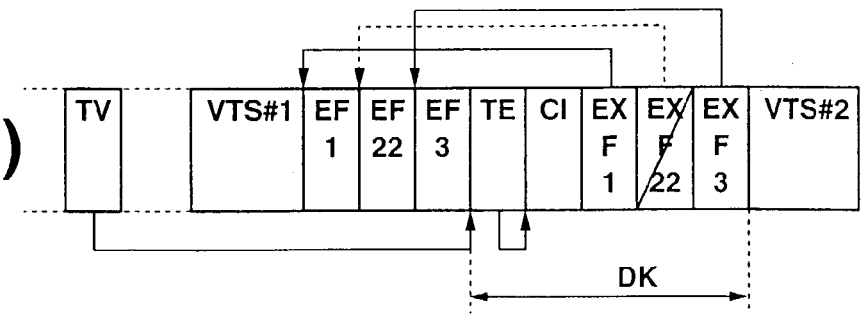

Also, to update or delete the extension files EF1, EF2 and EF3 thus recorded, the individual information EXF1 to EXF3 are updated by deleting the corresponding individual information EXF1 to EXF3 themselves, setting invalid flags indicating that the files in consideration have been deleted or by processing otherwise, as shown in FIGS. 11(B) to 11(D). Also, the individual information EXF1 to EXF3 are updated by overwriting the guide information TE and intermediate management information DK together. It should be noted that for real updating of the record in the optical disk 2, the operations to be done with the use of the memory of the microcomputer and at ejection of the optical disk 2 are the same as those in the first embodiment.

On the other hand, when recording a new intermediate management information DK1 correspondingly to the recording of additional extension files, the existent intermediate management information DK are combined together to generate management information CI and corresponding guide information TE, and they are sequentially recorded next to the extension files, as shown in FIG. 12. Also, the record in the management table TV is updated correspondingly to the above recording. Further, all the extension files recorded in the optical disk 2 are deleted or updated by updating the last recorded intermediate management information DK1.

By setting an address of extension-file guide information in an area next to the last recorded extension file in the optical disk as in this embodiment, the same effect as in the first embodiment can be assured even if the extension-file guide information varies.

(3) Third Embodiment

The present invention is applicable as a third embodiment to an optical disk drive as an external storage for a personal computer. In this embodiment, various files other than still picture files, such as the moving picture file defined in a different format from that of VTS, text file, map data, are applied as the above-mentioned extension files and recorded to the optical disk 2 as in the aforementioned first or second embodiment, and also the optical disk 2 is finalized.

Even in case other files than the still picture images are applied as the extension files as in this third embodiment, the similar effect to that in the first and second embodiments can be assured.

(4) Other Embodiments

Note that the present invention has been described concerning the first to third embodiments thereof in which one piece of guide information for extension files is recorded to the optical disk but the present invention is not limited to any of these embodiments and can widely be applied for recording a plurality of guide information whenever necessary, for example, for recording guide information for each of a collection of extension files successively recorded.

Also, in the aforementioned first to third embodiments, the guide information for extension files is used as provisional information until finalization of the optical disk, but the present invention is not limited to any of these embodiments aspect. Namely, the optical disk drive may be designed for use the guide information after the finalization as well.

Also, in the first to third embodiments, a series of operations is performed under an operational program pre-installed in the optical disk drive, but the present invention is not limited to any of these embodiments. Namely, the present invention can also be applied widely for effecting the series of operations according to a program downloaded via a network like the Internet or under a program provide being recorded in any one of various types of recording media. It should be noted that such as recording medium may be a magnetic disk, optical disk, magnetic tape or the like.

Also, in the first to third embodiments, the present invention is applied to an optical disk drive having an imaging function and an optical disk drive which is an external storage for a computer. However, the present invention is not limited to any of these embodiments, Namely, the present invention can also be applied widely for performing the above-mentioned series of operations under an application program for a computer.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

As having been described in the foregoing, the present invention provides an optical disk drive in which the address of management information can be identified with reference to a management table recorded in a fixed area on an optical disk so that by converting the format of management information recorded in combination with a file on the basis of the attribute of the file, it is made possible to record also any other file than a moving picture file for example, whereby the information recording area can be used more effectively and quick access can be assured.

What is claimed is:

1. A recording apparatus which manages a program area according to a management table recorded in a predetermined area of a recording medium to record a desired file to the program area, the apparatus comprising:

a management information generating means for generating management information for the file;

a recording means for recording the file in combination with the management information for the file to the program area; and a control means for controlling the operations of at least the management information generating means and recording means;

the control means controlling the management information generating means and recording means to:

record, when the file is a moving picture file formatted for reproduction by a dedicated reproducing apparatus for the recording medium, the moving picture file in combination with the management information to the program area, while recording the address of the management information to the management table;

record, when the file is an extension file other than the moving picture file formatted for reproduction by the reproducing apparatus, the extension file in combination with management information for the extension file to the program area with selection of a recording format for the extension file and different from that of the moving picture file;

record guide information for the extension file, including at least the address of the extension-file management information, to the recording medium; and record the address of the extension-file guide information to the management table.

2. The apparatus as set forth in claim 1, wherein the extension-file guide information is recorded at an address in the inner circumferential area of the recording medium where a first file starts being recorded.

3. The apparatus as set forth in claim 1, wherein the extension-file guide information is recorded in an area next to the last extension file recorded in the recording medium.

4. The apparatus as set forth in claim 1, wherein the control means selects a recording format for the file and management information by recording the file and management information, when the file is the moving picture file, in such a manner that the moving picture file management information, moving picture file and backup information for the management information will sequentially be laid in this order, and when the file is the extension file, in such a manner that the extension file and extension-file management information will be laid in this order.

5. The apparatus as set forth in claim 1, wherein the control means sets the file and management information, when the file is a moving picture file, in such a manner that the file will be recorded in a DVD video format.

6. The apparatus as set forth in claim 1, wherein the management information includes at least address information indicative of at least the address of the file and file-size information.

7. The apparatus as set forth in claim 1, wherein the control means records, when recording management information for additionally recorded extension file, the management information for the already recorded extension file together with that for the added extension file next to the added extension file, and updates the extension-file guide information for correspondence to the management information recorded together.

8. The apparatus as set forth in claim 1, further comprising a reproducing means for reading the file of each attribute recorded in the recording medium on the basis of the extension-file guide information and the management information.

9. The apparatus as set forth in claim 1, wherein the control means controls the operations of the management information generating means and recording means on the basis of the management table to record together the management information in the file and management information combination for all files recorded in the recording medium to a first one of management information recording areas of the recording medium, and the management information in the file and management information combination for only the moving picture file recorded in the recording medium to a second one of the management information recording areas.

10. The apparatus as set forth in claim 9, wherein:
the first management information recording area corresponds to a file management system of a computer; and
the second management information recording area corresponds to a file management system of a DVD video format.

11. A recording method in which a program area is managed according to a management table recorded in a predetermined area of a recording medium to record a desired file to the program area, the method comprising steps of:

recording, when the file is a moving picture file which can be read by a dedicated reproducing apparatus for the recording medium, the moving picture file in combination with management information for the moving picture file to the program area, while recording the address of the management information to the management table;

recording, when the file is an extension file other than the moving picture file which can be reproduced by the reproducing apparatus, the extension file in combination with management information for the extension file to the program area with selection of a recording format for the extension file and different from that of the moving picture file;

recording guide information for the extension file, including at least the address of the extension-file management information, to the recording medium; and recording the address of the extension-file guide information to the management table.

12. The method as set forth in claim 11, wherein the extension file guide information is recorded at an address in the inner circumferential area of the recording medium where a first file starts being recorded.

13. The method as set forth in claim 11, wherein the extension-file guide information is recorded in an area next to the last extension file recorded in the recording medium.

14. The method as set forth in claim 11, wherein a recording format is selected for the file and management information by recording the file and management information, when the file is the moving picture file, in such a manner that the moving picture file management information, moving picture file and backup information for the management information will sequentially be laid in this order, and when the file is the extension file, in such a manner that the extension file and extension-file management information will be laid in this order.

15. The method as set forth in claim 11, wherein the file and management information are set, when the file is a moving picture file, in such a manner that the file will be recorded in a DVD video format.

16. The method as set forth in claim 11, wherein the management information includes at least address information indicative of the address of the file and file-size information.

17. The method as set forth in claim 11, wherein for recording management information for additionally recorded extension file, the management information for the already recorded extension file is recorded, together with that for the added extension file, next to the added extension file, and the extension-file guide information is updated for correspondence to the management information recorded together.

18. The method as set forth in claim 11, wherein on the basis of the management table, the management information in the file and management information combination for all files recorded in the recording medium are recorded together to a first one of management information recording areas of the recording medium, and the management information in the file and management information combination for only the moving picture file recorded in the recording medium are recorded together to a second one of the management information recording areas.

19. The method as set forth in claim 18, wherein:
the first management information recording area corresponds to a file management system of a computer; and
the second management information recording area corresponds to a file management system of a DVD video format.

20. A recording program in which a program area is managed according to a management table recorded in a predetermined area of a recording medium to record a desired file to the program area, the method comprising steps of:
recording, when the file is a moving picture file which can be read by a dedicated reproducing apparatus for the recording medium, the moving picture file in combination with management information for the moving picture file to the program area, while recording the address of the management information to the management table;
recording, when the file is an extension file other than the moving picture file which can be reproduced by the reproducing apparatus, the extension file in combination with management information for the extension file to the program area with selection of a recording format for the extension file and different from that of the moving picture file;
recording guide information for the extension file, including at least the address of the extension-file management information, to the recording medium; and
recording the address of the extension-file guide information to the management table.

21. The program as set forth in claim 20, wherein the extension-file guide information is recorded at an address in the inner circumferential area of the recording medium where a first file starts being recorded.

22. The program as set forth in claim 20, wherein the extension-file guide information is recorded in an area next to the last extension file recorded in the recording medium.

23. The program as set forth in claim 20, wherein a recording format is selected for the file and management information by recording the file and management information, when the file is the moving picture file, in such a manner that the moving picture file management information, moving picture file and backup information for the management information will sequentially be laid in this order, and when the file is the extension file, in such a manner that the extension file and extension-file management information will be laid in this order.

24. The program as set forth in claim 20, wherein the file and management information are set, when the file is a moving picture file, in such a manner that the file will be recorded in a DVD video format.

25. The program as set forth in claim 20, wherein for recording management information for additionally recorded extension file, the management information for the already recorded extension file is recorded, together with that for the added extension file, next to the added extension file, and the extension-file guide information is updated for correspondence to the management information recorded together.

26. The program as set forth in claim 20, wherein on the basis of the management table, the management information in the file and management information combination for all files recorded in the recording medium are recorded together to a first one of management information recording areas of the recording medium, and the management information in the file and management information combination for only the moving picture file recorded in the recording medium are recorded together to a second one of the management information recording areas.

27. The program as set forth in claim 26, wherein:
the first management information recording area corresponds to a file management system of a computer; and
the second management information recording area corresponds to a file management system of a DVD video format.

28. A recording medium having recorded therein a recording program which a program area is managed according to a management table recorded in a predetermined area of a data recording medium to record a desired file to the program area, the program comprising steps of:
recording, when the file is a moving picture file which can be read by a dedicated reproducing apparatus for the recording medium, the moving picture file in combination with management information for the moving picture file to the program area, while recording the address of the management information to the management table;
recording, when the file is an extension file other than the moving picture file which can be reproduced by the reproducing apparatus, the extension file in combination with management information for the extension file to the program area with selection of a recording format for the extension file and different from that of the moving picture file;
recording guide information for the extension file, including at least the address of the extension-file management information, to the data recording medium; and
recording the address of the extension-file guide information to the management table.

29. The recording medium as set forth in claim 28, wherein the extension-file guide information is recorded in an area next to the last extension file recorded in the data recording medium.

30. The recording medium as set forth in claim 28, wherein the extension-file guide information is recorded in an area next to the last extension file recorded in the data recording medium.

* * * * *